US010967970B2

(12) United States Patent
Van Niekerk et al.

(10) Patent No.: US 10,967,970 B2
(45) Date of Patent: Apr. 6, 2021

(54) DURABLE MODULAR UNMANNED AERIAL VEHICLE

(71) Applicant: Vantage Robotics, LLC, San Francisco, CA (US)

(72) Inventors: Johannes Becker Van Niekerk, Livermore, CA (US); Tobin Fisher, San Francisco, CA (US); Craig Janik, Palo Alto, CA (US)

(73) Assignee: VANTAGE ROBOTICS, LLC, San Francisco, CA (US)

( * ) Notice: Subject to any disclaimer, the term of this patent is extended or adjusted under 35 U.S.C. 154(b) by 422 days.

(21) Appl. No.: 15/424,667

(22) Filed: Feb. 3, 2017

(65) Prior Publication Data

US 2017/0225783 A1 Aug. 10, 2017

Related U.S. Application Data

(60) Provisional application No. 62/292,164, filed on Feb. 5, 2016.

(51) Int. Cl.
*B64C 39/02* (2006.01)
*B64C 27/20* (2006.01)
*B64D 27/26* (2006.01)

(52) U.S. Cl.
CPC ............ *B64C 39/024* (2013.01); *B64C 27/20* (2013.01); *B64D 27/26* (2013.01);
(Continued)

(58) Field of Classification Search
CPC ........ B64C 2201/027; B64C 2201/042; B64C 2201/108; B64C 39/024; B64D 27/26;
(Continued)

(56) References Cited

U.S. PATENT DOCUMENTS 1,349,035 A * 8/1920 Alder ........................ B60B 9/26
301/104
1,375,267 A * 4/1921 Weil ..................... B60B 1/0207
301/56
(Continued)

FOREIGN PATENT DOCUMENTS

| EP | 2187714 A2 | 5/2010 |
|---|---|---|
| WO | WO 00/40464 A2 | 7/2000 |
| WO | WO 01/96179 A1 | 12/2001 |

OTHER PUBLICATIONS

International Search Report and Written Opinion dated May 8, 2017 for Application No. PCT/US2017/016585.

*Primary Examiner* — Medhat Badawi
(74) *Attorney, Agent, or Firm* — Knobbe, Martens, Olson & Bear, LLP

(57) ABSTRACT

An unmanned aerial vehicle (UAV) includes a fuselage that supports breakaway components that are attached using magnets. One component is a battery pack which powers the vehicle. Another component is a rotor set including two identical pod pairs that each support a motor and a propeller. Each motor is attached to a hub assembly that includes a plurality of spokes captured in a motor hub and sandwiched by a rigid motor printed circuit board on top and a rigid hub plate. The hub assembly construction is rigid in plane and functions to keep the motor firmly stable during operation. The hub assembly is compliant and resilient when impacted parallel to the plane. Other features of the pod pairs encage the otherwise dangerous spinning propeller. This allows the vehicle to operate with a higher level of safety than conventional UAVs.

16 Claims, 20 Drawing Sheets

(52) U.S. Cl.
CPC .. *B64C 2201/027* (2013.01); *B64C 2201/042* (2013.01); *B64C 2201/108* (2013.01)

(58) Field of Classification Search
CPC ....... B60B 1/0223; B60B 1/0246; B60B 1/04; B60B 1/042; B60B 1/14; B60B 9/26
See application file for complete search history.

(56) References Cited

U.S. PATENT DOCUMENTS

| | | | | |
|---|---|---|---|---|
| 3,128,062 | A * | 4/1964 | Brocard | B64C 27/20 244/23 C |
| 4,046,339 | A * | 9/1977 | Stancliffe | B64C 25/36 244/103 R |
| 4,529,253 | A * | 7/1985 | Ho | B60B 1/0276 301/104 |
| 5,303,546 | A * | 4/1994 | Farrell | F01B 9/023 123/18 A |
| 5,810,453 | A * | 9/1998 | O'Brien | B60B 1/041 301/110.5 |
| 6,450,445 | B1 * | 9/2002 | Moller | B64C 29/02 244/12.1 |
| 7,429,997 | B2 * | 9/2008 | Givon | G03B 35/00 348/46 |
| 8,328,130 | B2 * | 12/2012 | Goossen | B64C 27/20 244/17.11 |
| 8,430,709 | B1 * | 4/2013 | Wong | A63H 27/02 446/34 |
| 8,821,123 | B2 * | 9/2014 | Camci | F01D 25/26 416/189 |
| 8,903,568 | B1 * | 12/2014 | Wang | G05D 1/0016 701/2 |
| 9,004,393 | B2 * | 4/2015 | Barrett-Gonzales | B64C 27/24 244/14 |
| 9,174,732 | B2 * | 11/2015 | Jensen | B64C 39/022 |
| 9,266,609 | B1 * | 2/2016 | Kunz | B64C 29/0008 |
| 9,305,317 | B2 * | 4/2016 | Grokop | B60W 40/09 |
| 9,481,204 | B1 * | 11/2016 | Wiebe | A01G 25/09 |
| 9,540,105 | B2 * | 1/2017 | Markov | B64C 39/016 |
| 9,567,076 | B2 * | 2/2017 | Zhang | B64C 1/00 |
| 9,567,081 | B1 * | 2/2017 | Beckman | B64D 1/12 |
| 9,616,998 | B2 * | 4/2017 | Oakley | B64C 27/08 |
| 9,630,710 | B2 * | 4/2017 | Hutson | B64C 27/08 |
| 9,688,400 | B2 * | 6/2017 | Hutson | B64C 39/024 |
| 9,760,072 | B2 * | 9/2017 | Hall | H04W 4/80 |
| 9,815,552 | B1 * | 11/2017 | Welsh | B64C 27/20 |
| 9,836,053 | B2 * | 12/2017 | Wang | G05D 1/0088 |
| 9,840,339 | B1 * | 12/2017 | O'Brien | B64D 47/08 |
| 9,842,505 | B2 * | 12/2017 | Wang | G05D 1/0214 |
| 9,896,182 | B1 * | 2/2018 | Beckman | B64D 1/12 |
| 9,927,682 | B2 * | 3/2018 | Fisher | G03B 15/006 |
| 9,938,009 | B2 * | 4/2018 | Christensen | A63H 17/28 |
| 2002/0149257 | A1 * | 10/2002 | Miansian | B60B 1/0261 301/74 |
| 2003/0230928 | A1 * | 12/2003 | Schroepfer | B60B 1/0207 301/59 |
| 2007/0152497 | A1 * | 7/2007 | Lin | B60B 1/0207 301/55 |
| 2008/0191544 | A1 * | 8/2008 | Schlanger | B60B 1/003 301/59 |
| 2010/0120273 | A1 * | 5/2010 | Lucero | H05K 1/02 439/79 |
| 2011/0024553 | A1 * | 2/2011 | Choi | A63H 27/12 244/17.11 |
| 2013/0162008 | A1 * | 6/2013 | Li | B60B 1/042 301/58 |
| 2014/0131507 | A1 * | 5/2014 | Kalantari | A63H 27/12 244/2 |
| 2014/0319266 | A1 * | 10/2014 | Moschetta | B64C 25/36 244/13 |
| 2014/0343752 | A1 * | 11/2014 | Fisher | B64C 39/024 701/2 |
| 2015/0323930 | A1 * | 11/2015 | Downey | G08G 5/006 701/2 |
| 2016/0200437 | A1 * | 7/2016 | Ryan | B64C 39/022 244/99.2 |
| 2016/0228764 | A9 * | 8/2016 | Condon | G05D 1/0033 |
| 2016/0229530 | A1 * | 8/2016 | Welsh | B64C 39/024 |
| 2016/0236774 | A1 * | 8/2016 | Niedzballa | B64C 27/30 |
| 2016/0236789 | A1 * | 8/2016 | Burns | B64C 39/024 |
| 2016/0318615 | A1 * | 11/2016 | Pick | B64C 39/024 |
| 2016/0339981 | A1 * | 11/2016 | Vermeulen | B60B 1/003 |
| 2016/0340049 | A1 * | 11/2016 | Ferreyra | B64D 17/80 |
| 2016/0355257 | A1 * | 12/2016 | Chappell | B64C 39/024 |
| 2017/0050726 | A1 * | 2/2017 | Yamada | B64C 27/08 |
| 2017/0154535 | A1 * | 6/2017 | Downey | G08G 5/006 |
| 2018/0275654 | A1 * | 9/2018 | Merz | G01S 13/9303 |

* cited by examiner

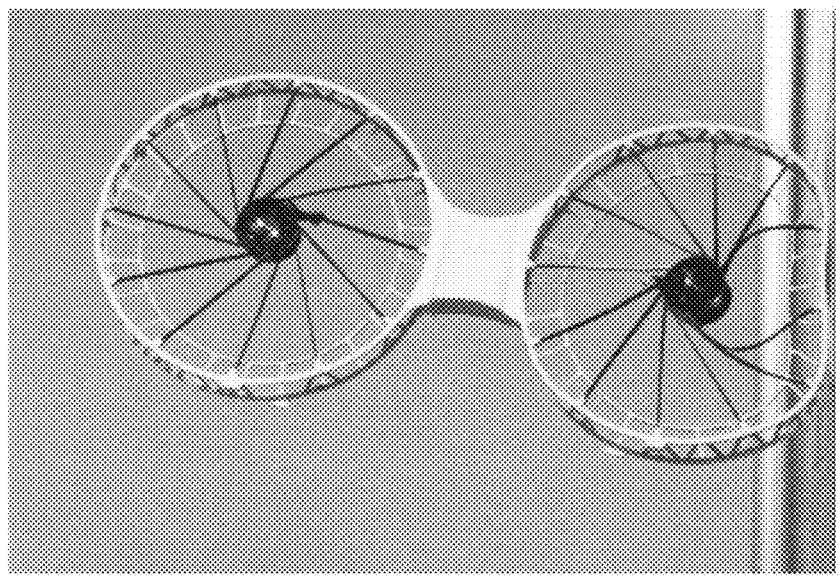
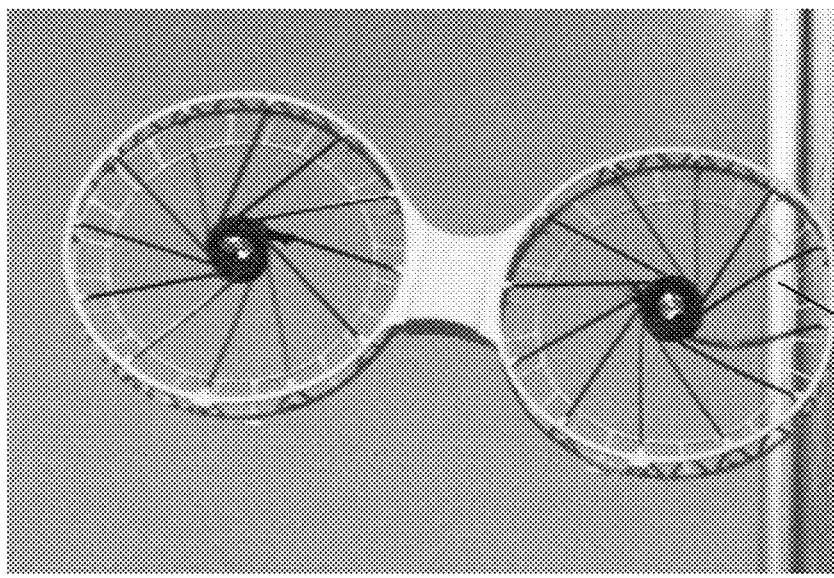
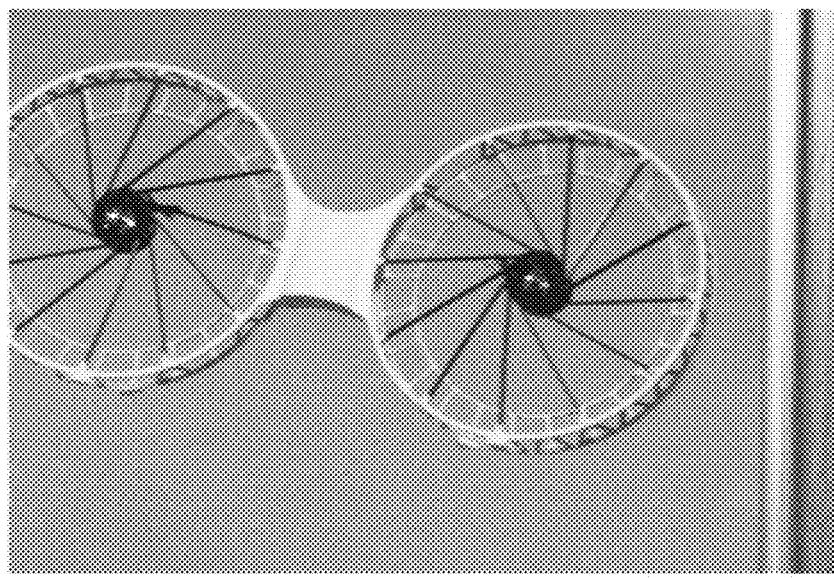
FIG. 20

US 10,967,970 B2

DURABLE MODULAR UNMANNED AERIAL VEHICLE

CROSS-REFERENCE TO RELATED APPLICATIONS

This application claims the benefit of U.S. Provisional Application No. 62/292,164, filed Feb. 5, 2016, and entitled DURABLE MODULAR UNMANNED AERIAL VEHICLE, the disclosure of which is hereby incorporated by reference in its entirety.

BACKGROUND

Technical Field

Embodiments disclosed herein relate generally to aerial vehicles, and more particularly to structural improvements for multi-rotor unmanned aerial vehicles (UAVs) that provide for enhanced performance and more convenient portability

BRIEF DESCRIPTION OF THE DRAWINGS

FIG. 20 is a series of frames from a high-speed video of a pod pair dropped onto a hard surface.

Like reference numbers and designations in the various drawings indicate like elements. Note that the relative dimensions of the figures may not be drawn to scale.

BACKGROUND

Figure 1:
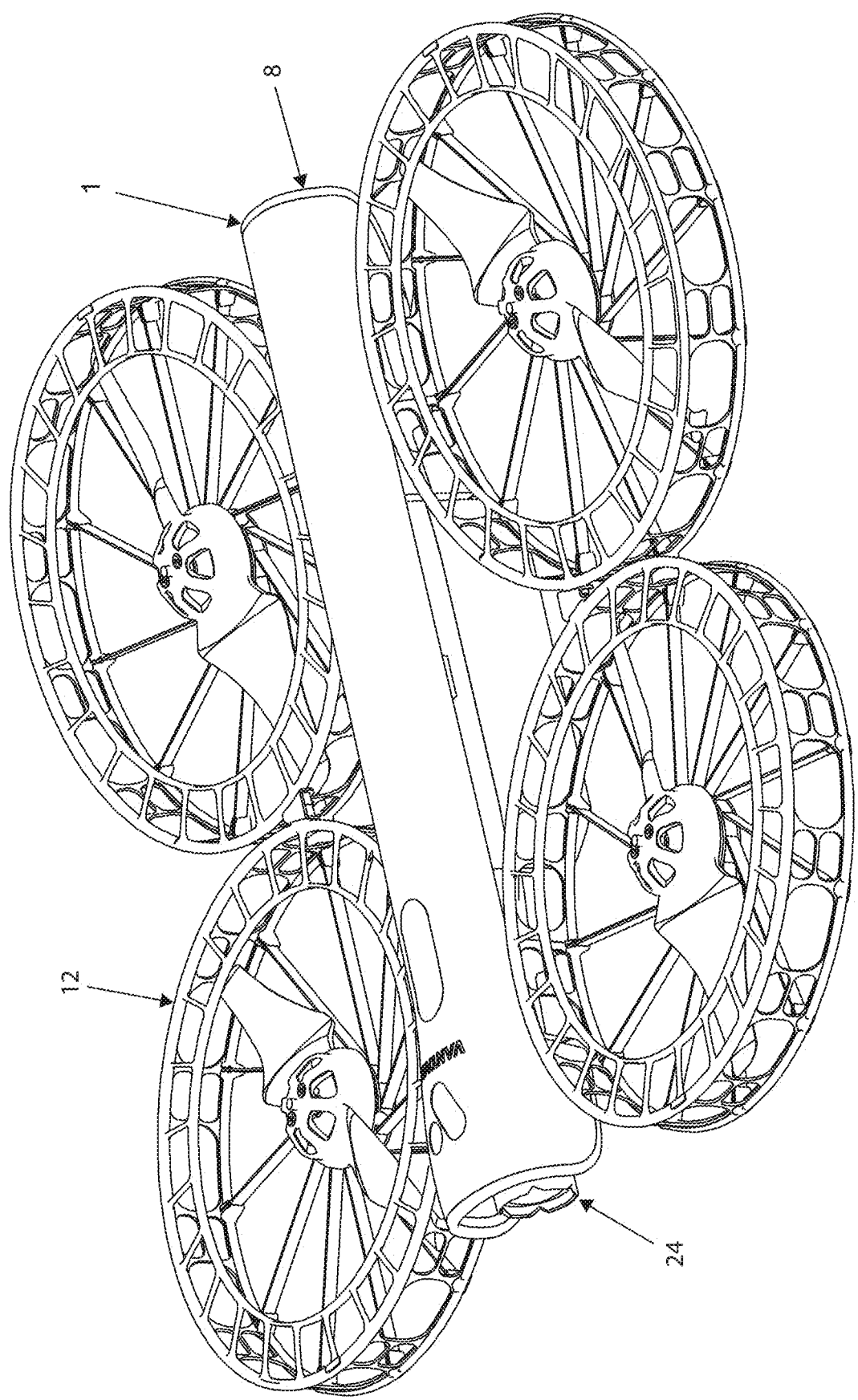
FIG. 1 shows a quadcopter with modular components.

Small UAVs are increasingly used for aerial reconnaissance, typically recording video and still images for later viewing, or viewing in real-time. Depending on the size and desired lift-capacity, a typical UAV is powered by either a single gas-powered engine or several electric powered motors with the required thrust for lift being generated by at least one, but usually three or more spinning propellers. Each propeller includes one or more radially disposed blades extending from a central hub. The hub of each propeller is mechanically connected, either directly or indirectly through a transmission, to the drive shaft of the engine or each motor used. At first glance, a UAV resembles a radio controlled model helicopter, except that a helicopter's conventional tail rotor is not required with a UAV since the multi-propeller design effectively cancels out any propeller-generated rotational thrust that must otherwise be controlled using a tail-rotor in single-propeller designs.

As with model helicopters, the unprotected spinning blades pose a tremendous risk with the potential of inflicting damage to the craft itself or nearby property, but more importantly to the operator of the UAV or other people or animals.

Many attempts have been made to protect the blades by enclosing them in rigid frame structures or using so-called prop guards, which either partially surround or fully encircle the propellers. These frame structures or guards are generally made from EPS (expanded polystyrene), injected molded plastics, or composites and although are usually effective at preventing accidental side-contact with a spinning propeller, they usually do not survive moderate impact, should the UAV impact an object during flight. These prior art prop-protecting structures typically flex and deform during impact and cause damage to the craft and the propellers.

While each approach to protect the propeller from damage or contact has specific benefits, they all also include one or more weaknesses, such as being too heavy, too fragile, too large, creating excessive wind drag, or creating unwanted turbulence around the spinning propeller, which reduces performance and efficiency. Additionally, when these protections only protect the tips of the spinning propellers from the side, it remains possible to access the propellers from either the top or bottom. This accessibility creates a tremendous hazard to a person's fingers and also makes the propellers vulnerable to damage from sticks, rocks, or any other foreign objects.

Another problem with conventional UAVs is that they rarely survive impact and often become "grounded" until a broken part can be repaired or replaced. The fragility of conventional UAVs is both frustrating and counter-productive to carrying out their intended task.

SUMMARY

Certain embodiments described herein relate to a motor hub assembly, including a motor supported by a motor mount, an outer protective structure circumscribing and spaced apart from the motor mount, and a plurality of spokes extending radially outward from the mount and extending at least between the mount and the protective structure, the plurality of spokes being substantially more resistant to flexure out of a plane normal to a rotational axis of the motor than to flexure parallel to the plane normal to the rotational axis of the motor.

The plurality of spokes can have a rectangular cross-section within a plane normal to a line between the motor mount and the protective structure along which the spokes extend. The assembly can include at least one propeller blade coupled to the motor and configured to rotate within a plane normal to the rotational axis of the motor. The plurality of spokes can have a cross-sectional shape which tapers to a narrower width on the side of the spokes proximate the at least one propeller blade.

The motor mount can include a compliant material. The the plurality of spokes can extend along lines which do not intersect the rotational axis of the motor.

The motor mount can include a central hub, the central hub including a plurality of inwardly extending slots configured to receive radially inward ends of the plurality of spokes, an upper plate overlying at least a portion of the radially inward ends of the plurality of spokes received within the plurality of inwardly extending slots, and a lower plate underlying at least a portion of the radially inward ends of the plurality of spokes received within the plurality of inwardly extending slots. The central hub can include a deformable material and can be compressed between the upper plate and the lower plate to frictionally retain the radially inward ends of the plurality of spokes. The upper plate can include a circuit board configured to carry power to the motor.

The protective structure can be concentric with the motor mount. The protective structure can be concentric with an axis of rotation of the motor. The plurality of spokes can include a carbon fiber material. The plurality of spokes can include a pultruded carbon fiber material.

The plurality of spokes can inhibit displacement of the motor along an axis of rotation of the motor to a greater degree than displacement of the motor within a plane normal to the axis of rotation of the motor. The the plurality of spokes can further inhibit rotation of the motor mount out of the plane normal to the axis of rotation of the motor.

Some embodiments described herein relate to a motor hub assembly including a compliant motor mount, a plurality of carbon fiber spokes fastened to the motor mount and constrained compressively substantially in plane by a top rigid hub plate and a bottom rigid hub plate, and a protective outer ring, each of the plurality of fiber spokes fastened to the outer ring. The top hub plate can include a rigid circuit board configured to carry power to a motor.

Some embodiments described herein relate to a thrust pod assembly including a protective structure, the protective structure including an upper portion including an inner hoop, an outer hoop, and a plurality of protective ribs connecting the inner hoop to the outer hoop, a bottom part including an outer hoop, and a cylindrical rim fastened to the outer hoop of the top part and the outer hoop of the bottom part, a compliant motor mount, and a plurality of carbon fiber spokes, each spoke fastened at one end to the outer hoop of the bottom part of the protective structure, the plurality of spokes constrained compressively substantially in plane by a top rigid hub plate and a bottom rigid hub plate.

DETAILED DESCRIPTION OF THE PREFERRED EMBODIMENT

As used herein, the term "flying mode" is used to refer to a mode in which the quadcopter is airborne, and may be under the control of a flight control subsystem. As used herein, the term "static mode" is used to refer to a mode in which the quadcopter is assembled with all modules attached and can be ready to fly. The propellers may or may not be spinning. As used herein, the term "portable mode" is used to refer to a mode in which the quadcopter modules are disassembled for transport and storage.

Figure 2:
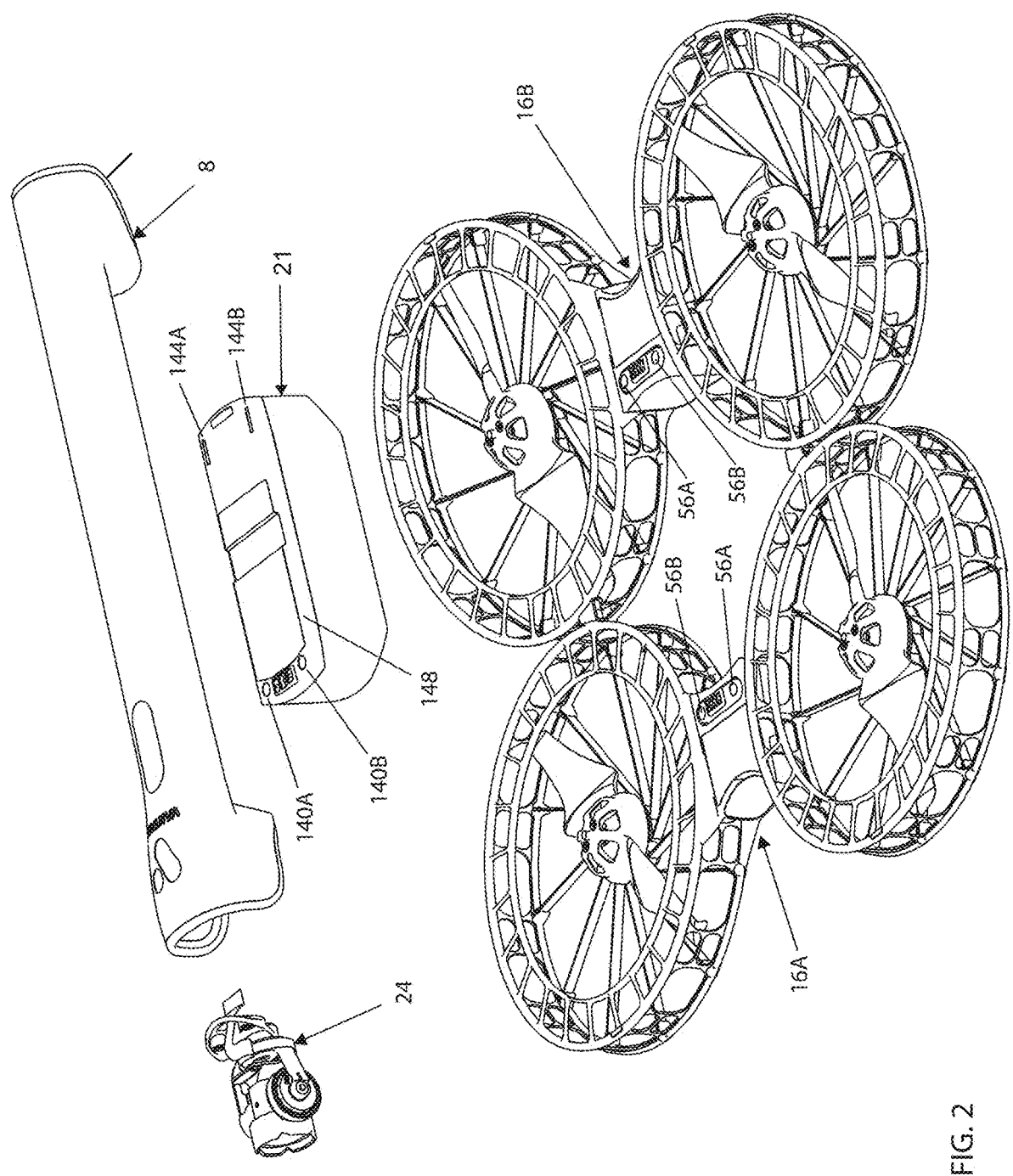
FIG. 2 shows a quadcopter with the modular components moved away from the fuselage.

FIG. 1 and FIG. 2 show a quadcopter 1 with modular components including a rotor set 12, a battery 21, and a camera gimbal 24. Quadcopter 1 fuselage 8 encloses an electronics sub-system that includes a power conversion circuit, motor controllers, a flight control sub-system, a gimbal control sub-system, and various sensors including an IMU, a sonar sensor, a GPS receiver, and a Wifi transceiver. The electronics sub-system is not described in detail as they are not the subject of the invention.

Fuselage Attachment Features

Figure 3:
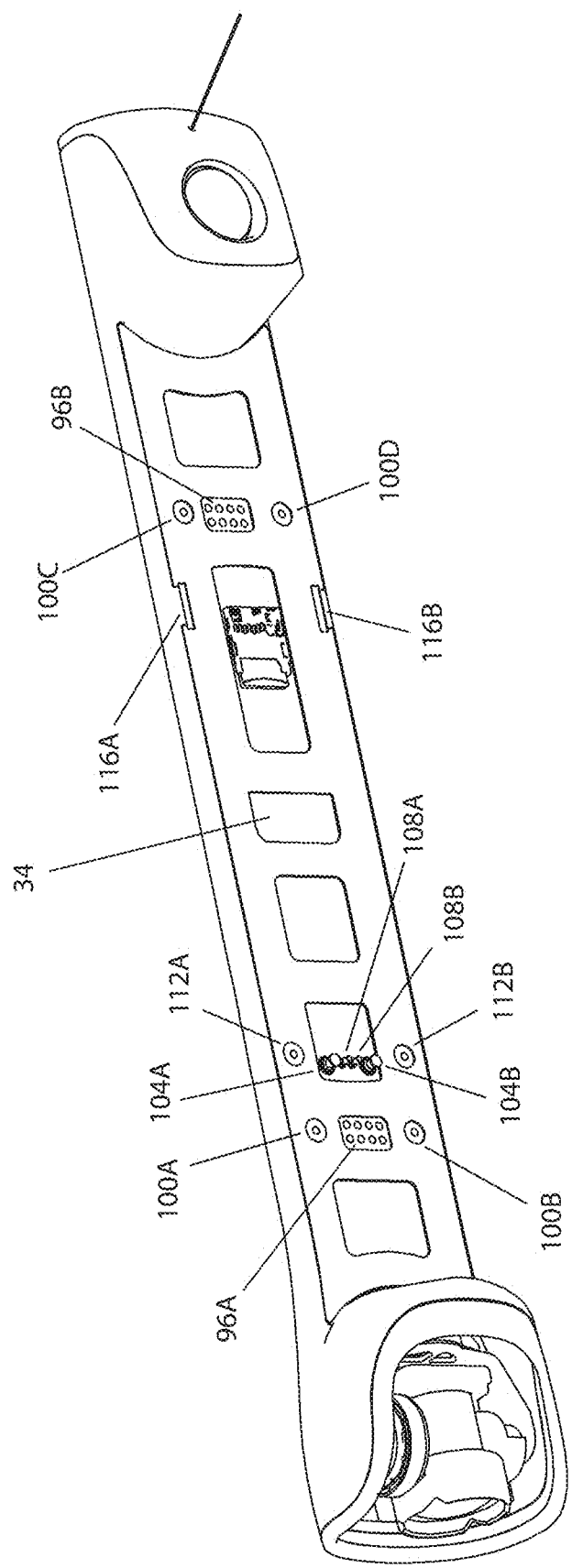
FIG. 3 is a view of the bottom side of the fuselage.

FIG. 3, a view of the bottom side of fuselage 8, shows magnetic, power, and electrical signal interface features for rotor set 12 and battery 21 module. In the illustrated embodiment, a plurality of pod motor contacts 96A and 96B are gold plated pads integral to a motherboard 34 and functionally connected to the four DC motors 36A, 36B, 36C, and 36D included in rotor set 12. Corresponding to motor contacts 96A and 96B are two pairs of a cylindrical pod attach magnet 100A and 100B, and 100C and 110D, fastened into and flush with the bottom surface of fuselage 8.

Two battery power contacts 104A and 104B are soldered onto motherboard 34 and functionally connect to battery +V and GND respectively when battery 21 is attached. Two each of a cylindrical battery attach magnet 112A and 112B are mounted in and flush with the bottom surface of fuselage 8. Two each of a prismatic battery attach magnet 116A and 116B are mounted in and flush with the bottom surface of fuselage 8.

Magnets 100A, 100B, 100C, and 100D, 112A and B, and 116A and 116B are comprised of nickel-plated neodymium and in some embodiments are fastened into fuselage 8 with cyanoacrylate adhesive. In other embodiments, such as the embodiment shown in FIG. 8, magnet 118 is mechanically captured in fuselage 8 by an annular step feature 120 on a magnet 118 in combination with a rib feature 124 added to fuselage 8.

Lightweight and Durable Pod Construction

Referring now to FIG. 2, rotor set 12 is comprised of pod pair 16A and 16B, which are identical. FIG. 3, an exploded assembly view, shows that pod pair 16A includes a pod top 8 and a pod bottom 20 both manufactured of injection-molded polycarbonate plastic. Pod top 8 and pod bottom 20 both include a center enclosure portion and a circular hoop portion on either side. Pod bottom 20 includes a plurality of spoke bosses 37 which are a molded in U-shaped channel. Each of spokes 48 are inserted into a spoke boss 37. In one embodiment spokes 48 are fastened to spoke bosses 37 with flexible epoxy adhesive.

Figure 4:
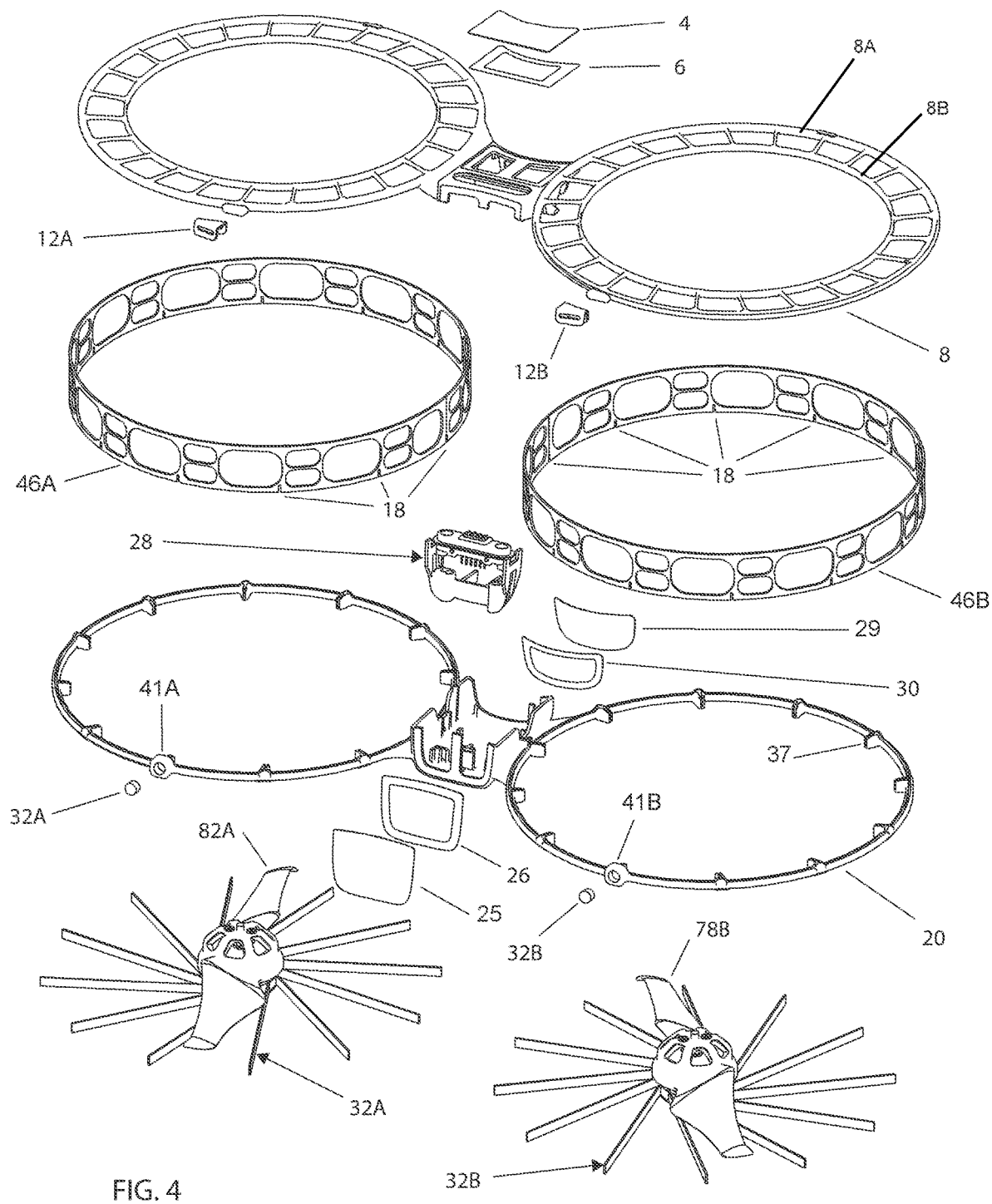
FIG. 4 is an exploded view of a pod pair.
Figure 5:
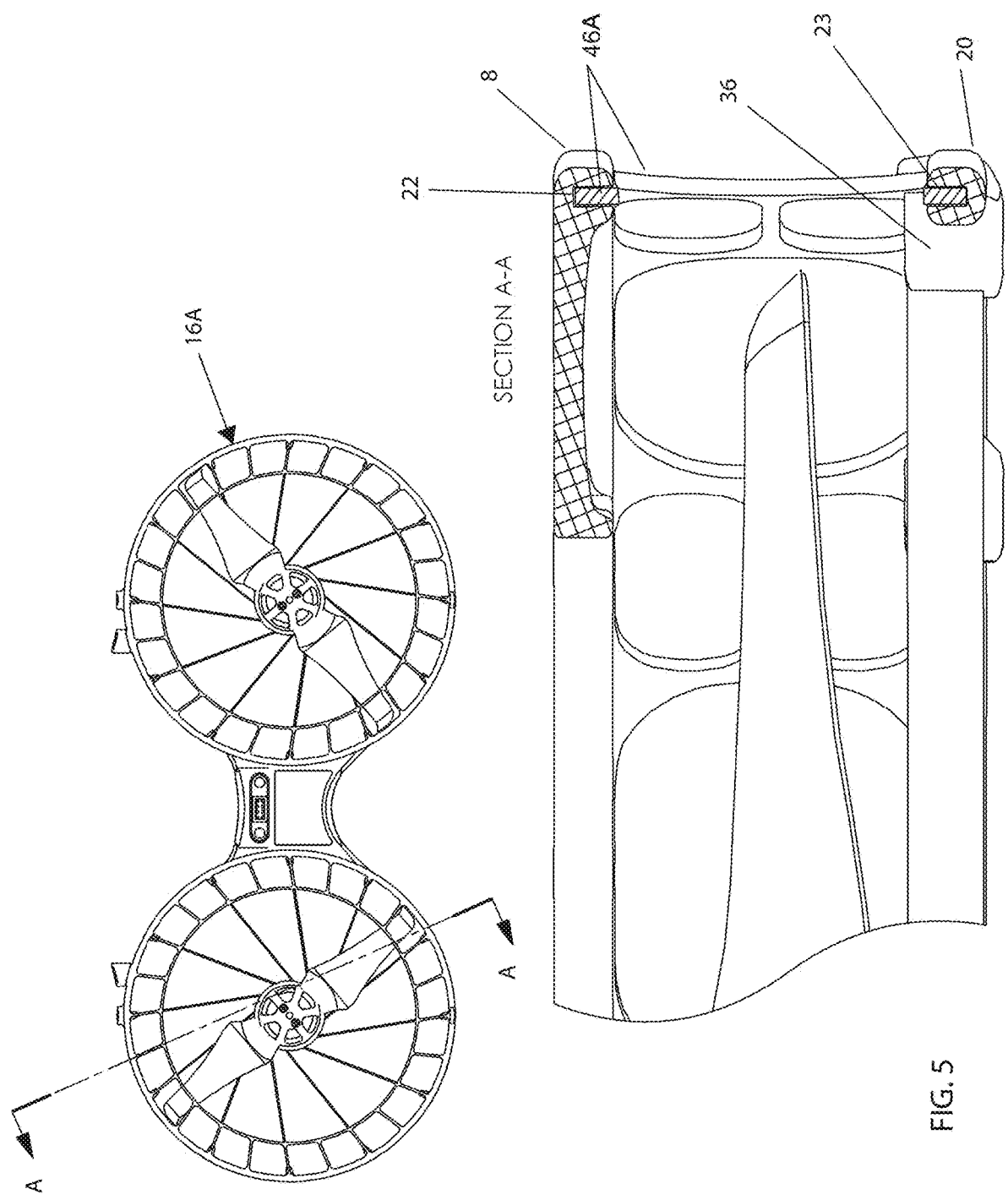
FIG. 5 shows a section through a pod pair.

A carbon fiber rim 46A and 46B is fastened to both pod top 8 circular hoop portion and pod bottom 20 circular hoop portion. Referring now to FIG. 5, an enlarged section view of pod pair 16A, pod top 8 circular hoop portion includes a pod top inverted U-shaped channel 22 and pod bottom 20 includes a pod bottom U-shaped channel 23 sized to accept carbon fiber rim 46A. A plurality of protective ribs connect the outer hoop 8A of pod top 8 to the inner hoop 8B (see FIG. 4). In one embodiment rim 46A and 46B are fastened to pod top 8 and pod top bottom with flexible epoxy adhesive. Rim 46A and 46B are fabricated by routing a flat shape out of carbon fiber sheet which is then bent into a circular shape. FIG. 4 shows that rim 46A includes a plurality of spoke slots 18 for accepting spokes 48 when assembled in pod pair 16A and 16B, providing the benefit of mechanically coupling the lightweight and stiff composite components.

In another embodiment pod bottom 20 is injection-molded around rim 46A and 46B and spokes 48. Then pod top 8 is fastened to the partial assembly. In another embodiment pod bottom 20 is first injection-molded, then spokes 48 and rim 46A and 46B are inserted into pod bottom 20 circular portions and pod bottom 20 is re-heated to form a bond around spokes 48 and rim 46A and 46B.

Pod Fastening for Durability and Weight Reduction

Referring again to FIG. 3 the center enclosure portions of pod top 8 and pod bottom 20 are fastened together by adhering battery side label 25 to battery side label VHB 26, which is in turn adhered to the battery side surfaces of pod top 8 and pod bottom 20. Likewise fuselage side label 29 is adhered to fuselage side label VHB 30, which is in turn adhered to the fuselage side surfaces of pod top 8 and pod bottom 20. Fuselage side label 29 and battery side label 25 are comprised of 0.010 inch thick polycarbonate sheet die cut to shape. Fuselage side label VHB 30 and battery side label VHB 26 are comprised of 5906 0.15 mm thick VHB tape due cut to shape. A top label 4 is a die cut polycarbonate 0.010 inch thick sheet die cut to shape and is adhered to the top surface of pod top 8 by a die cut VHB top label VHB 6 part also comprised of 5906 VHB tape. 5906 tape is manufactured by 3M Company of St. Paul, Minn.

FIG. 3 shows that the top, front, and rear surfaces of center enclosure portion of pod top 8 and pod bottom 20 include large openings. Top label 4, fuselage side label 29, and battery side label 25 all function as thin, lightweight enclosure walls providing for a substantially sealed enclosure. Additionally the fastening means provided by fuselage side label VHB 30, battery side label VHB 26, and top label VHB 6 dynamically strains but does not release thereby absorbing impact if quadcopter 1 crashes.

Motor Vibration Isolation Sub-System

In some embodiments, quadcopter 1 can be used to record high definition images and video while flying. All aerial vehicles are susceptible to various internal and external dynamic loads that cause the vehicle to change its position and/or orientation. The purpose of 2-axis gimbal 24 is to dynamically respond to the motions of quadcopter 1 to maintain a substantially steady view of the imaged subject. One source of internal loads are vibrations produced by DC motors 36 and the propellers 78A and B, and propellers 82A and B. FIG. 4 shows a motor vibration isolation sub-assembly 28 that functions to isolate motor 36A, B, C, and D, and propeller 78A and B, and 82A and B vibrations from gimbal 24 mounted on fuselage 8.

Figure 7:
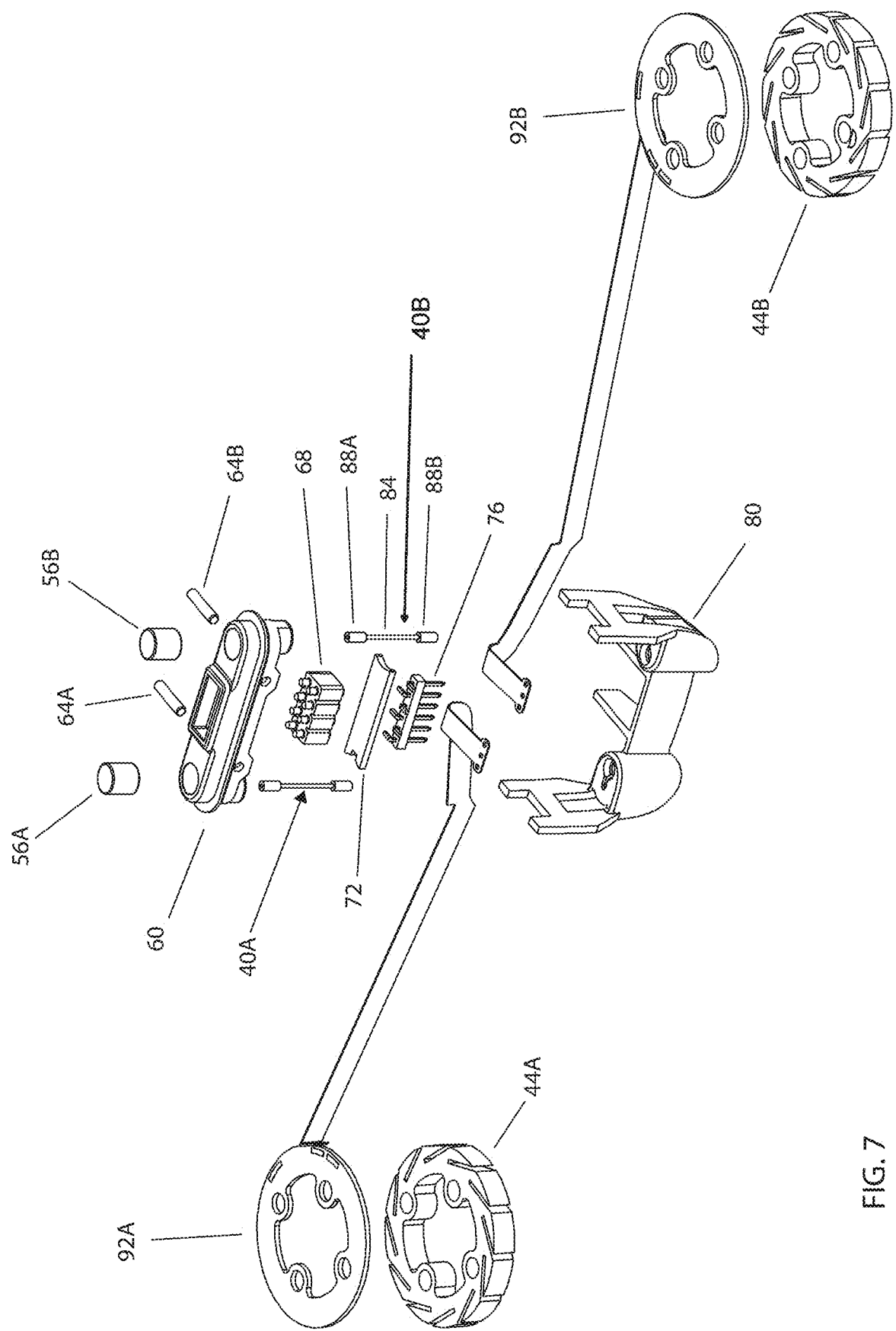
FIG. 7 is an exploded view of the vibration isolation sub-assembly.

FIG. 7 shows that vibration isolation sub-assembly 28 is comprised of a connector plate 60, a magnet 56A and 56B, a vibration isolation flexure sub-assembly 40, the stainless steel dowel pins 64 and 64B, an 8-pin spring-loaded connector 68, a connector PCB 72, and a pin header 76.

Figure 8:
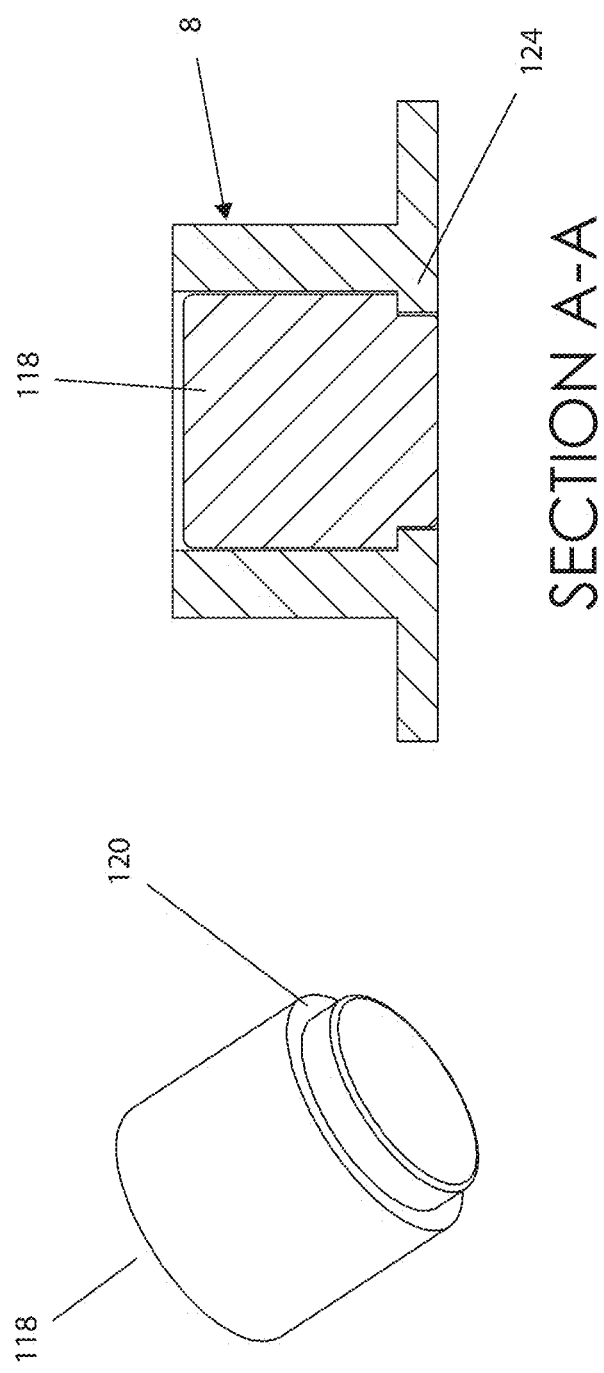
FIG. 8 shows a magnet with a step feature.

Each of pod magnet 56A and 56B are fastened into cavities in connector plate 60 with cyanoacrylate glue. Connector plate 60 cavities are sized so that the top surface of magnet 56A and 56B are flush with the adjacent top surface of connector plate 60. In another embodiment magnet fastening is accomplished as shown in FIG. 8 incorporating magnet 118 with annular step feature 120 in combination with a step feature 124 added to connector plate 60.

Connector plate 60 is positioned in vibration isolation sub-assembly 28A and 28B such that connector plate 60 partially protrudes from the top surface of pod top 8, but never comes in contact with pod top 8 when quadcopter 1 is in flying mode. There is a substantially rigid mechanical connection between each of motors 36A and 36B and pod bottom 20. Pod top 8 and pod bottom 20 are also fixedly attached. Therefore when quadcopter 1 is in flying mode, motor 36A and 36B are coupled to pod bottom 20 and pod top 8 which vibrates substantially at the same frequency and energy as motors 36A and 36B.

Connector plate 60 is mechanically attached to pod bottom 20 by a vibration isolation wire sub-assembly 40A and 40B, each of which is comprised of a wire 84 with a crimp 88A and 88B fixedly attached at each end. Crimp 88A is fixedly captured in connector plate 60 and crimp 88B is fixedly captured in an isolation wire mount 80. Isolation wire mount 80 is fixedly attached to pod bottom 20.

FIG. 7 also shows that a motor rigid flex 92A and 92 B includes a flexible portion that is located inside the enclosure created by pod top 8 and pod bottom 20, and is soldered to a pin header 76 which in turn is soldered to a connector PCB 72, providing an electrical circuit for powering motors 36A and 36B. The flexible portion of rigid flex circuit 92A and 92B is substantially thin and is designed with extra length to form a service loop. Therefore the flexible portion of rigid flex circuit 92A and 92B exerts minimal load on connector plate 60.

Connector plate 60 is substantially rigidly attached to fuselage 8 by the magnetic force of magnet couples comprising pod attach magnets 100A, B, C, and D and, and pod magnets 56A and 56B. Therefore when quadcopter 1 is in flying mode fuselage 8 vibrates substantially less than pod top 8 due to the free length and flexibility of wire 84.

Magnetic Module Attachment System

Referring now to FIG. 2 and FIG. 3, pod magnet 56A and 56B are mounted in connector plate with reversed polarities. Pod attach magnets 100A, B, C, and D are mounted with corresponding opposite polarities so that rotor set 12 is firmly magnetically attached to fuselage 8. Likewise battery attach magnets 112A and 112B are configured with reverse polarity, as are battery attach magnets 116A and 116B. Battery magnets 140A, 140B, 144A, and 144B are mounted with corresponding opposite polarities so that battery 21 is firmly magnetically attached to fuselage 8. Configuring magnet pairs in close vicinity as described constitutes a closed magnetic field that reduces the interference of the stray magnetic fields on a magnetometer 150 included in the rear section of fuselage 8 while increasing the magnetic field strength.

Pod Motor Hub Construction

Figure 6:
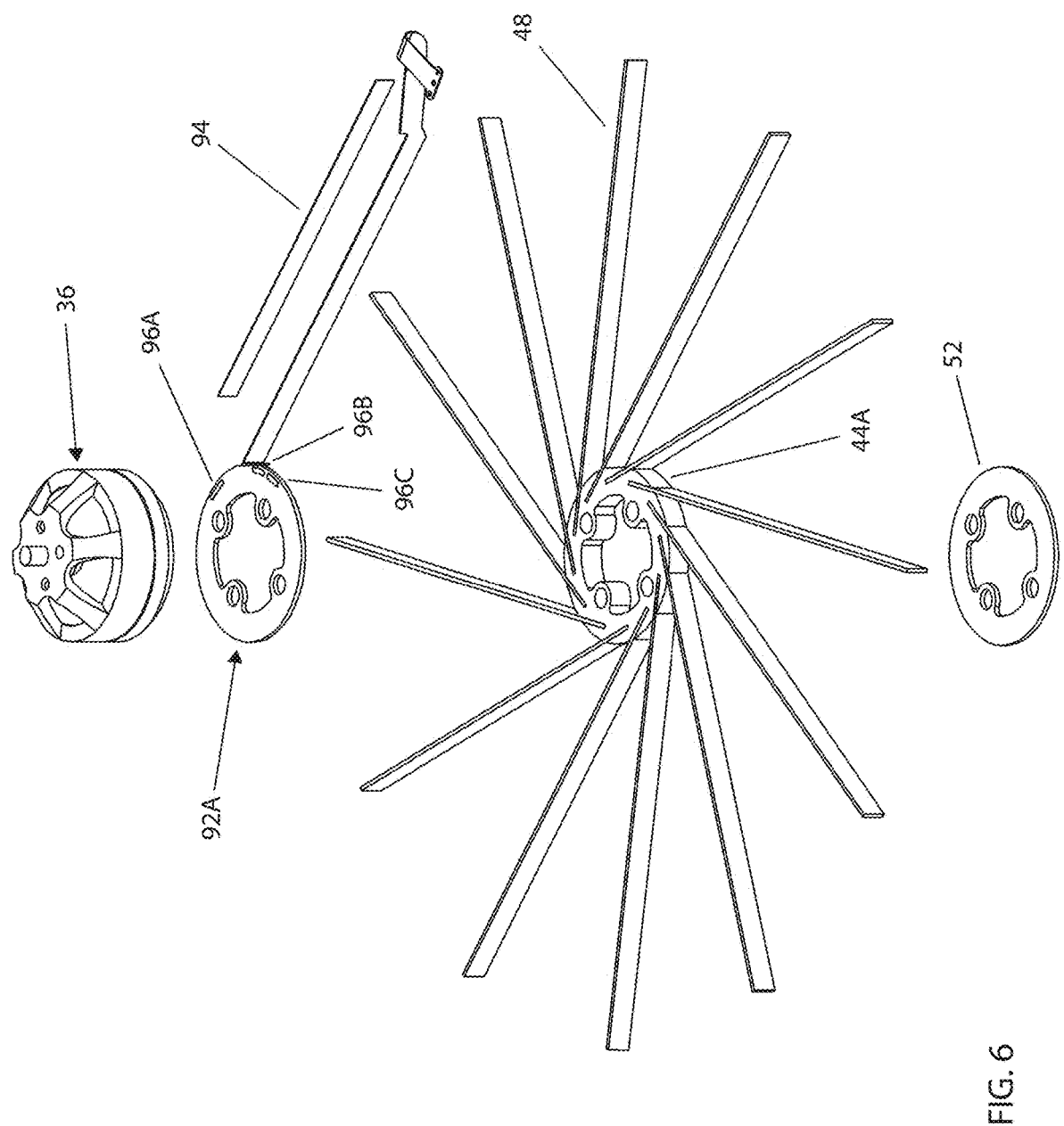
FIG. 6 shows an exploded view of a hub assembly.

FIG. 6 shows that hub assembly 32 is comprised of a flexible motor hub 44A co-molded around a portion of a plurality of pultruded carbon fiber spokes 48. In one embodiment there are twelve spokes 48 per motor. In another embodiment, spokes 48 are fastened to motor hub 44 with a toughened instant adhesive. Motor hub 44A is sandwiched between the rigid portion of motor rigid-flex circuit 92A and a carbon fiber hub plate 52. When assembled a flexible portion of motor rigid-flex 92A is fastened to one of spoke 48 by a motor flex VHB tape 94. DC motor 36 is fastened to hub assembly 32 by four screws (not shown) inserted from the bottom through hub plate 52. In one embodiment motor hub 44A is molded out of a thermos-plastic elastomer with a durometer of SHORE 80 A. In another embodiment, motor hub 44A is molded out of polycarbonate plastic.

Referring again to FIG. 6, spokes 48 are arranged tangentially, providing for a longer spoke 48 length and increased motor hub 44A to spoke 48 bond surface area and increased portion of spoke 48 that is clamped by the rigid portion of motor rigid-flex circuit 92A and hub plate 52, thereby increasing the stiffness of hub assembly 32. In one embodiment carbon fiber pultruded spokes 48 have a rectangular cross section. In another embodiment carbon fiber pultruded spokes 136 have a teardrop cross section shape oriented with the wider cross section dimension near the propellers. This streamlined cross sectional shape has a substantially lower drag coefficient, thereby increasing the efficiency of the propellers. In another embodiment, spokes X have an oval cross-section which substantially reduces the drag induced by a cross-wind.

Figure 10:
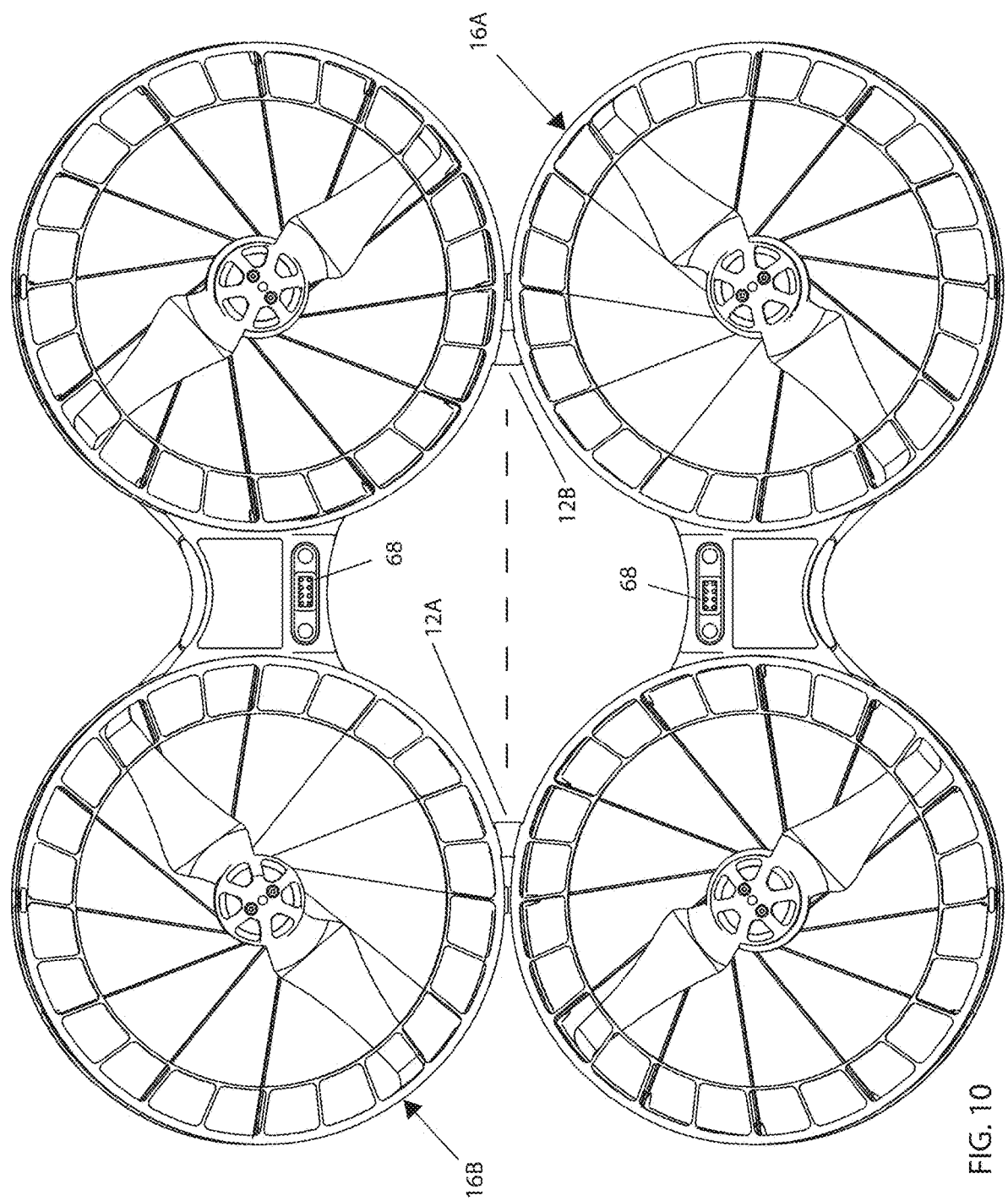
FIG. 10 is a top view of the rotor set.

The pod pair plane may be defined as the plane where the motor rotational axis is normal, for example in FIG. 10 the pod pair plane is parallel to the drawing sheet. The embodiment of hub assembly 32 that includes elastomeric motor hub 44A results in pod pair 16A that is substantially rigid in torsion and bending in the pod pair plane, but is compliant when impacted from directions parallel or close to parallel to the pod pair plane. FIG. 20 shows a series of frames from a high-video of a pod pair dropped from 10 feet onto a hard surface. The video images show that spokes 48, pod top 8 hoop feature, pod bottom hoop feature 20, and rim 46B deflect to absorb and return the impact energy, causing pod pair 16A to bounce with no damage.

Figure 9:
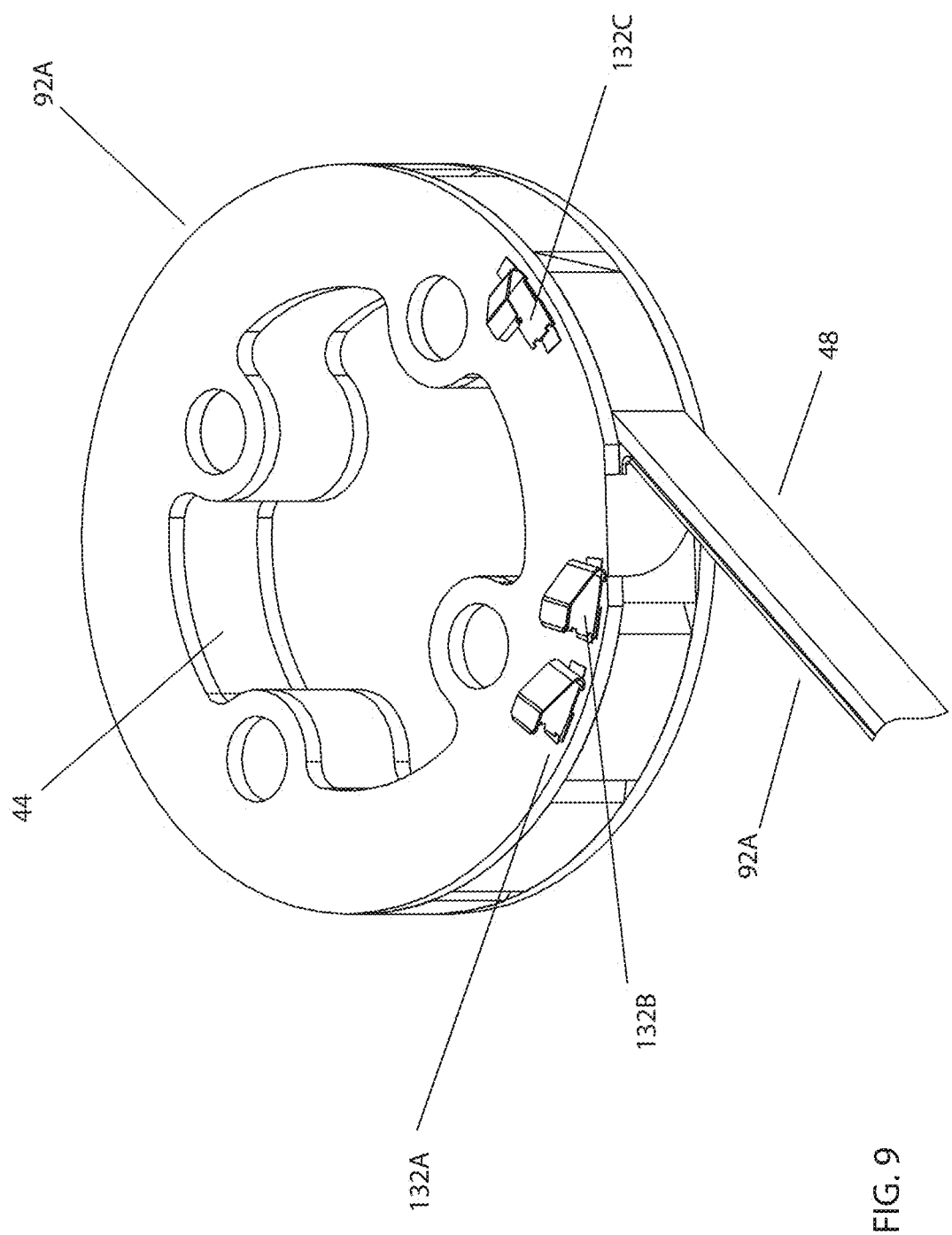
FIG. 9 is a magnified view of a portion of the motor hub assembly.

FIG. 9 is a magnified view of a portion of hub assembly 32 with only spoke 48 that is laminated to motor flex circuit 92A shown. Three each of a spring contact 132A, B, and C are soldered to pod motor contacts 96A, B, and C. Motor 36 includes corresponding electrical contacts that align with spring contacts 132A, B, and C when motor 36 is assembled to hub assembly 32. In one embodiment spring contacts 132A, B, and C are part number 1447360-8 manufactured by TE Connectivity, Inc. of Berwyn, Pa.

Pod Hinge Design

Figure 11:
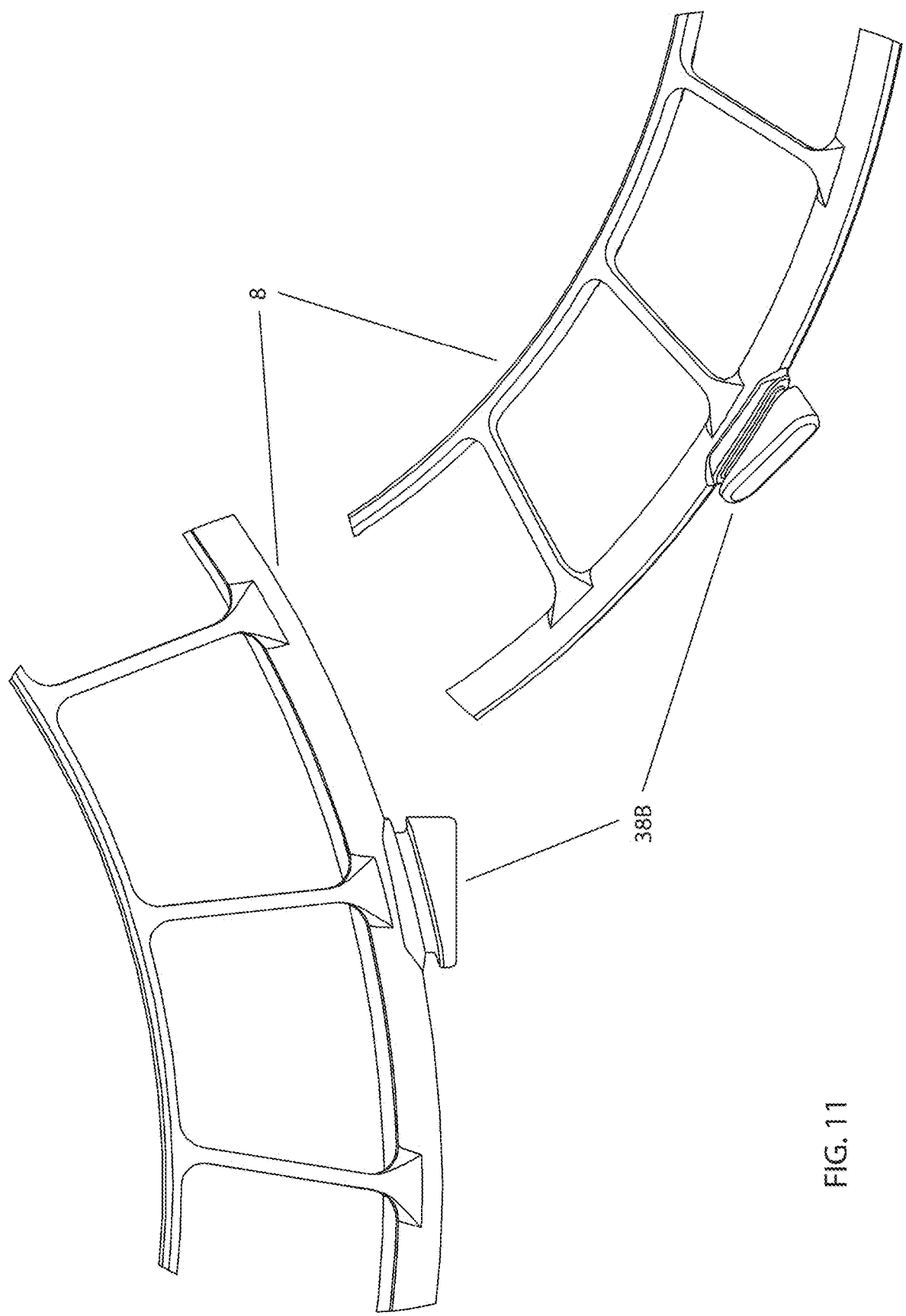
FIG. 11 is an enlarged detail view of the rotor set hinge.
Figure 12:
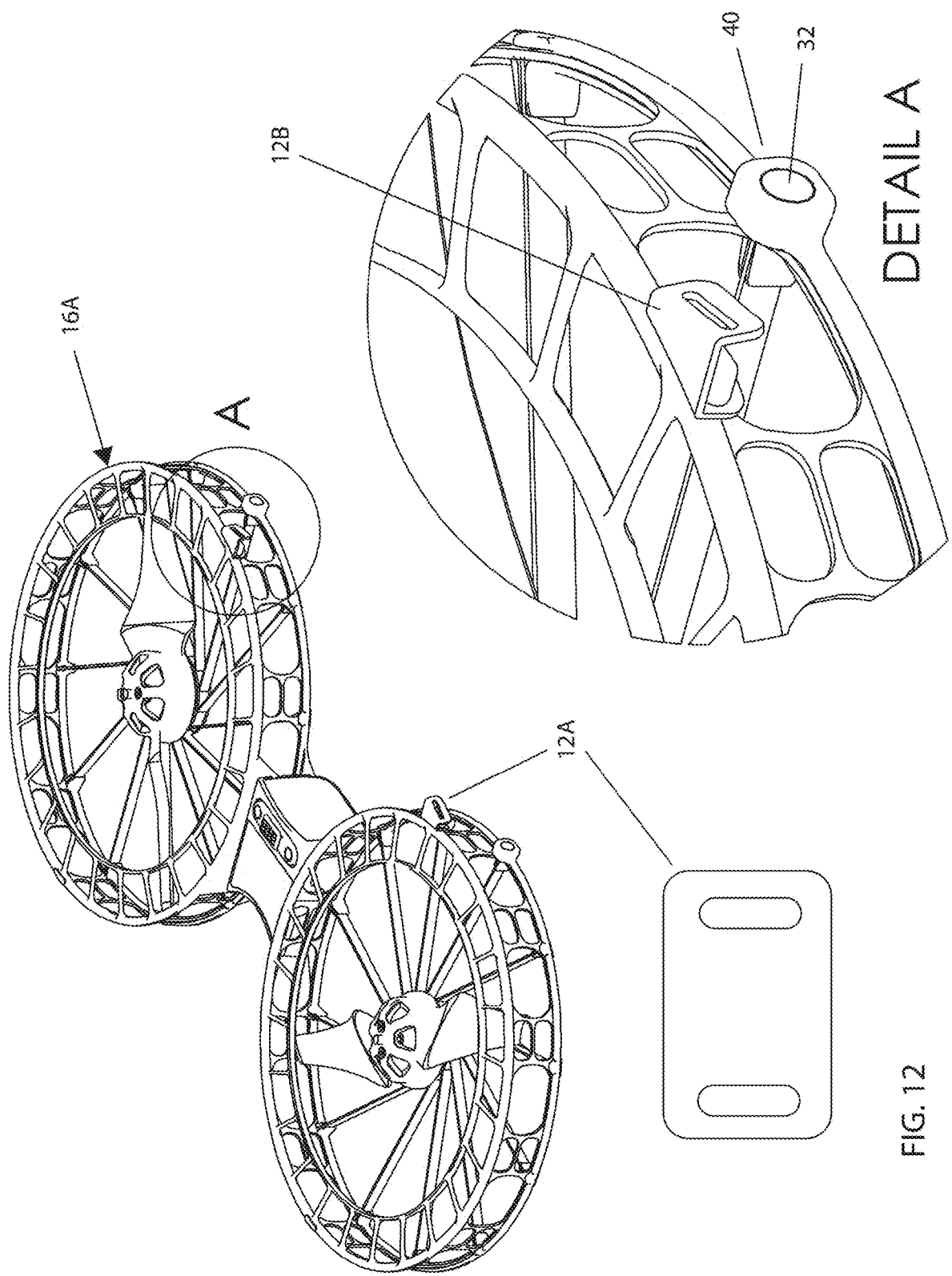
FIG. 12 shows a view of a pod pair and a detail view of the hinge.
Figure 13:
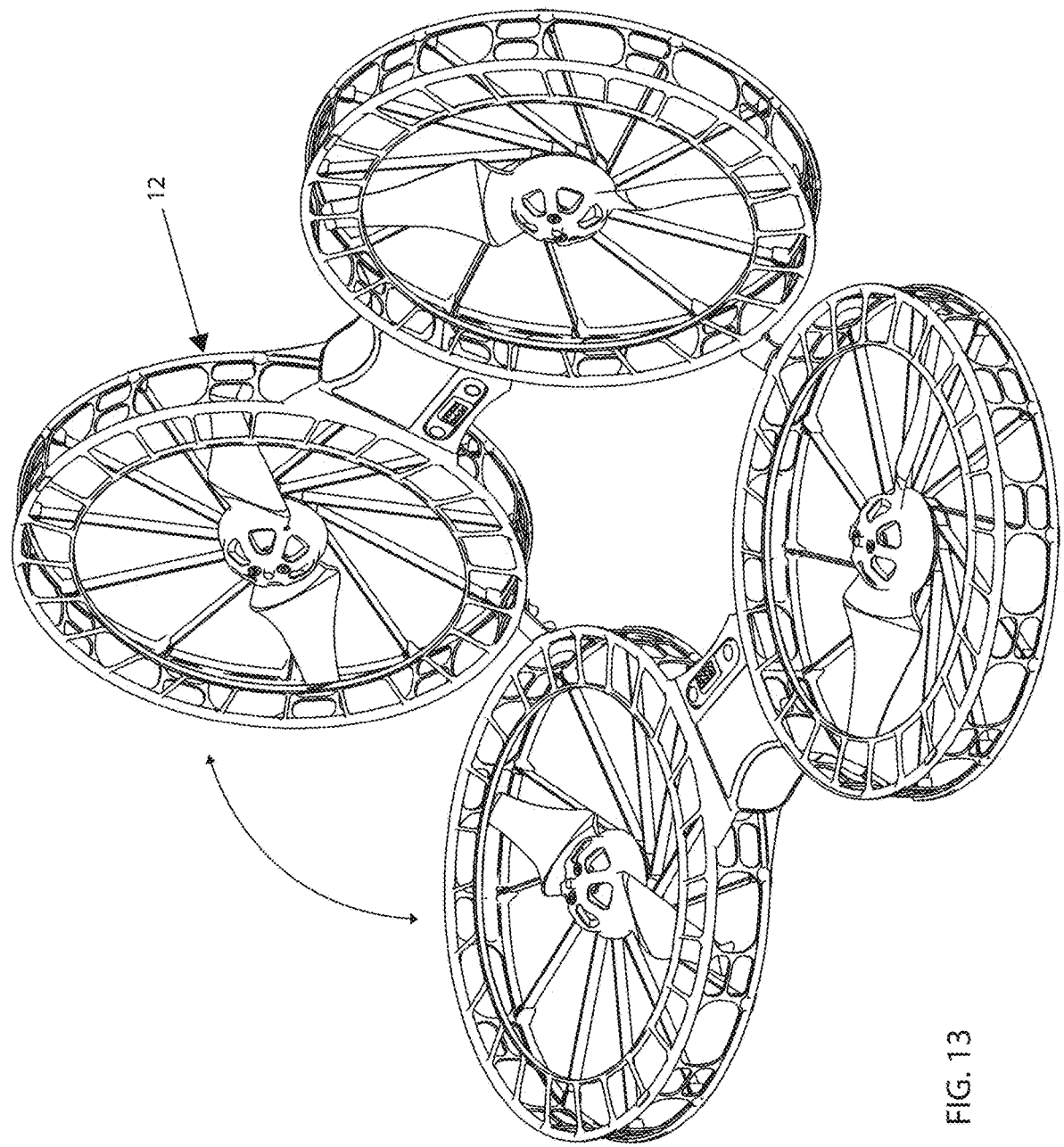
FIG. 13 shows the a rotor set in the process of folding.

Referring now to FIG. 11 and FIG. 12, rotor set 12 includes a hinge flexure 12A and 12B that connect pod pair 16A and 16B. In one embodiment hinge flexure 12A and 12B is die cut 0.0325 inch thick graphene reinforced nitrile rubber sheet. FIG. 12 includes a drawing (not to scale) of the flattened die cut shape of hinge flexure 12A that shows an oval hole at each end. Detail A in FIG. 12 shows hinge flexure 12B mounted to pod pair 16A in the flexed state when rotor set 12 is in the open and mounted configuration (rotor set 16B is not shown).

FIG. 11 shows two views of a hinge flange 38A and 38B to which hinge flexure 12A is mounted. Hinge flange 38A is a feature integral to pod top 8 and includes a stem and an enlarged flange feature. Hinge flexure 12A die cut oval holes are smaller in size than hinge flange 38A flange feature. One end of hinge flexure 12A is stretched over hinge flange 38A and is retained by hinge flange 38A enlarged flange feature. Likewise the other end of hinge flexure 12A is stretched over hinge flange 38B on pod top 8 in pod pair 16B. When rotor set 12 is in the open configuration, as shown in FIG. 10, hinge flexures 12A and 12B are in a stretched tension state thereby constraining pod pair 16A and 16B together.

Referring now to FIG. 4, pod bottom 20 includes the hinge magnet bosses 41A and 41B, into which are placed the hinge magnets 32A and 32B with opposite polarity. In one embodiment hinge magnets 32A and 32B are fastened with cyanoacrylate adhesive. When rotor set 12 is in the open position and constrained by stretched hinge flexures 12A and 12B, hinge magnet 32A and 32B opposite polarity magnetic fields accurately and firmly align and reversibly fasten rotor set 12. Applying a firm rotational force along rotor set 12 virtual hinge axis (denoted by the dashed line in FIG. 10) will break the magnetic bond and allow pod pair 16A and 16B to rotate to the closed position, shown in FIG. 14.

Figure 14:
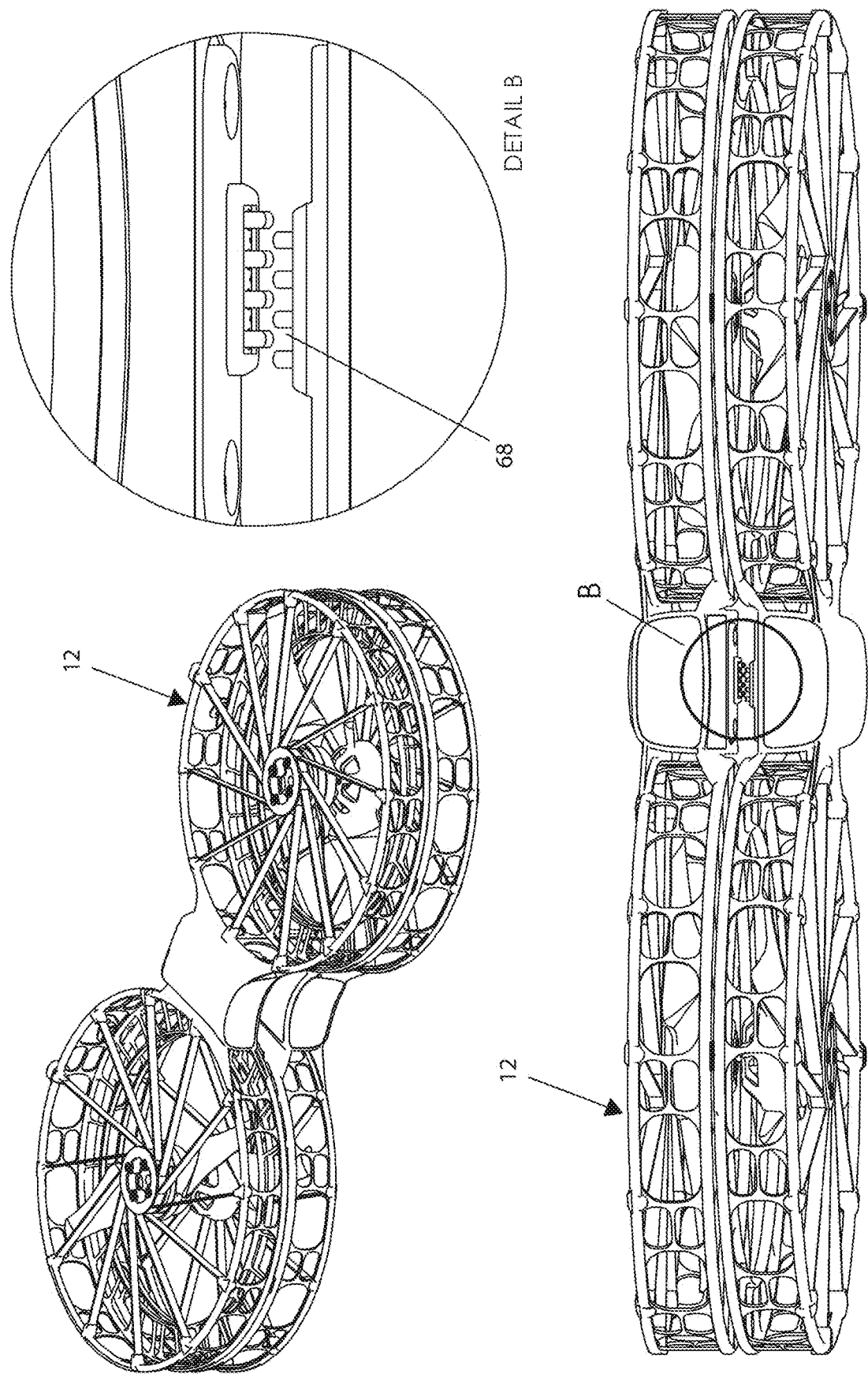
FIG. 14 shows two views of a fully folded rotor set and a detail view of nested spring pins.
Figure 15:
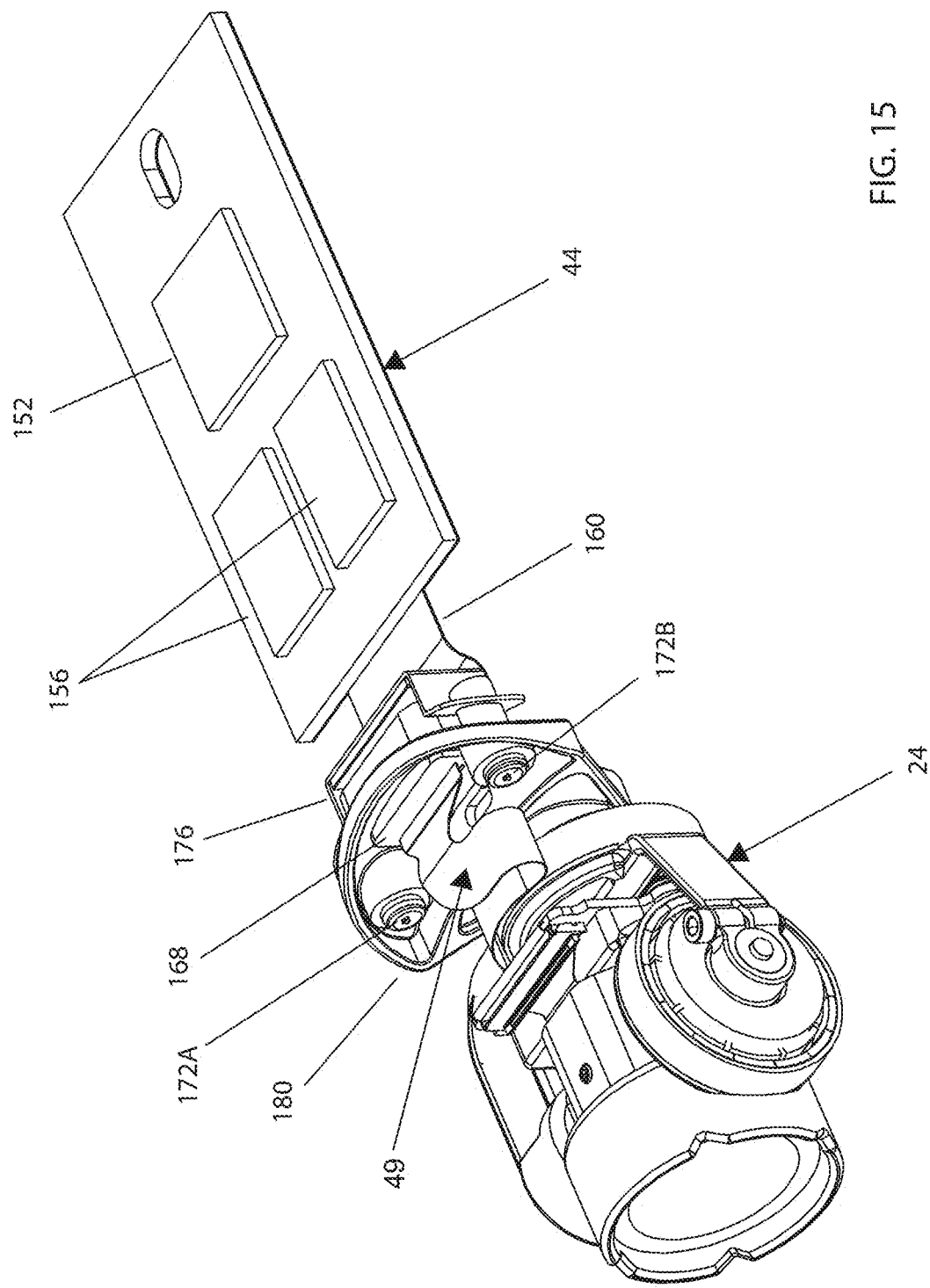
FIG. 15 shows the gimbal attached to the video processing circuit sub-system.

FIG. 14 shows two views of rotor set 12 in the closed position. Referring now to FIG. 10, spring-loaded connector 68 is located off-center in connector plate 60 by one-quarter of the spring pin pitch. In one embodiment the pitch of the spring pins in spring-loaded connector 68 is 2.54 mm, therefore the offset is 0.635 mm. Because rotor set 12 is comprised of two identical pod pairs 16A and 16B, where 16B is rotated so that hinge magnets 32A and 32B are apositioned when rotor set 12 is open, the combined offsets of each of spring-loaded loaded connector 68 results in a relative offset of one-half of the spring pin pitch. FIG. 14 DETAIL B therefore shows that spring-loaded pins nest beside each other when rotor set 12 is in the closed position.

In the rotor set 12 closed position shown in FIG. 14, pod connector magnet 56A and 56B in each of pod pair 16A and 16B are apositioned and close together so that there is a magnetic attraction force acting to keep rotor set 12 in the closed position.

Modular Gimbal Attachment

Figure 16:
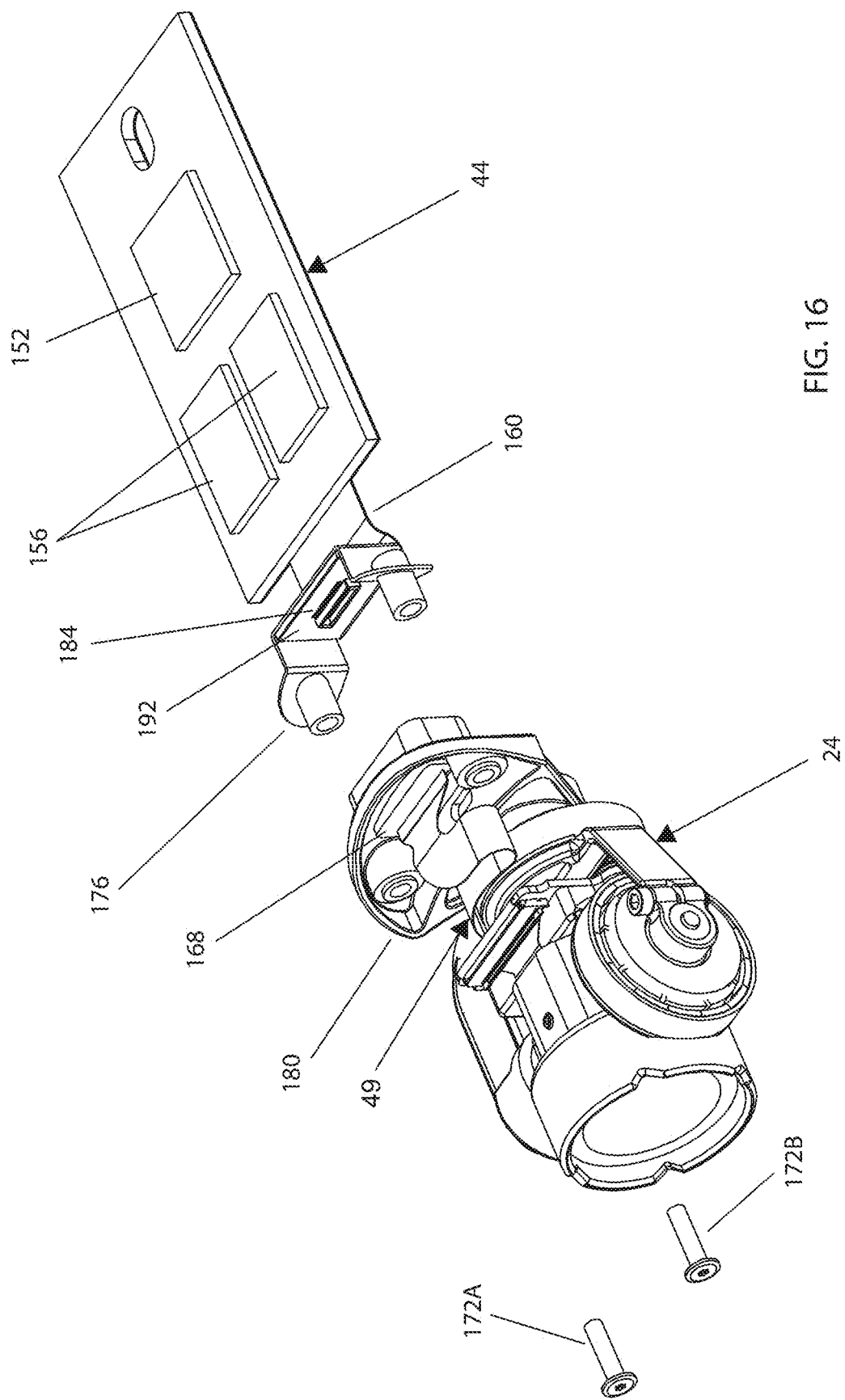
FIG. 16 shows the gimbal detached from the video processing circuit sub-system.
Figure 18:
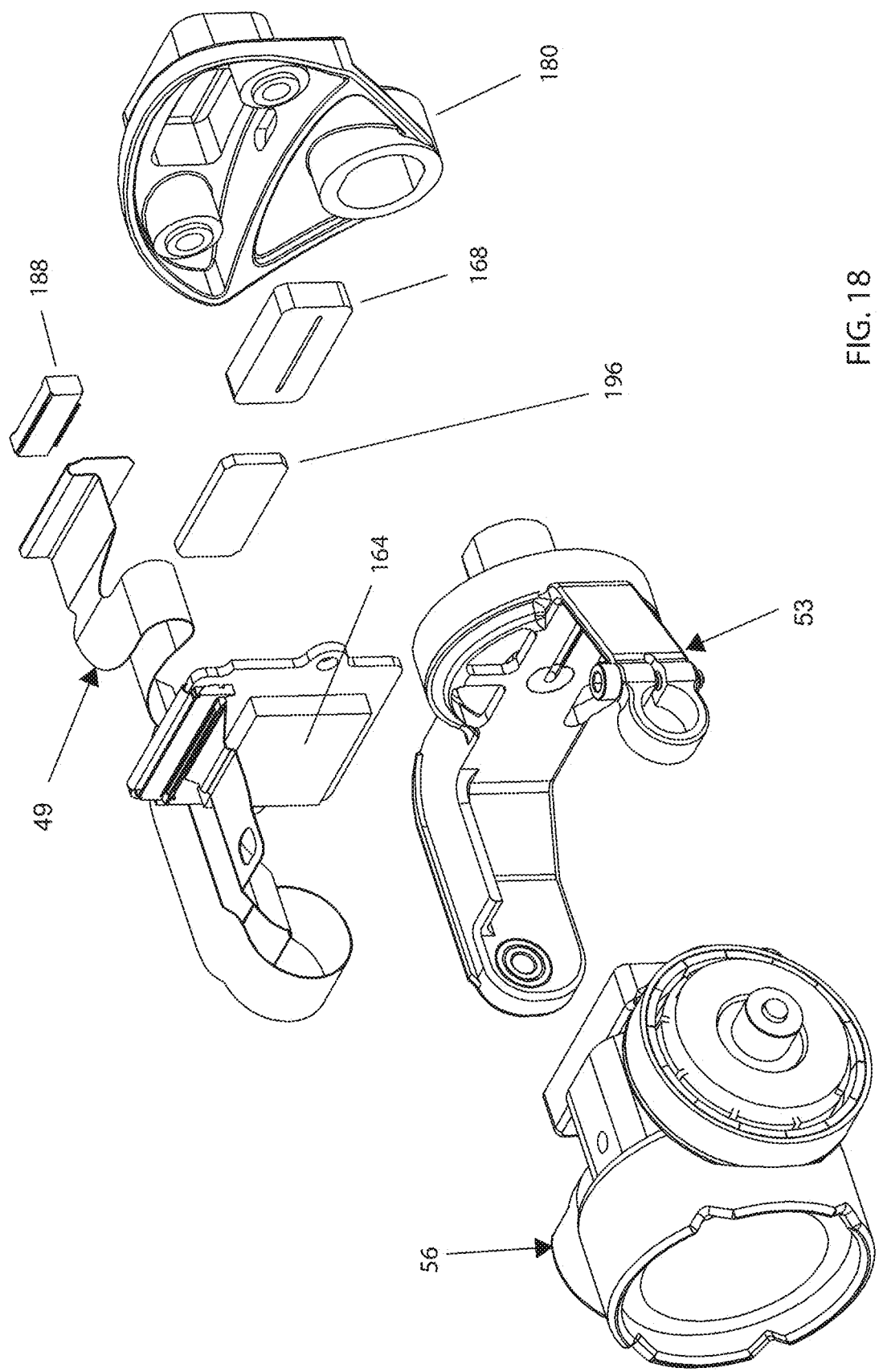
FIG. 18 is an exploded view of the gimbal.

FIG. 16 shows the components associated with a modular replaceable camera gimbal 24. Gimbal 24 includes two axes of rotation for the purpose of camera aiming and stabilization. A gimbal mount 180 is fixedly attached to a roll stage 53 (shown in FIG. 18). In one embodiment gimbal mount 180 is a comprised of injection-molded polycarbonate plastic. A camera rigid-flexible circuit assembly 49 is configured with service loop lengths to allow for rotational motion of roll stage 53 and pitch stage 56. FIG. 16 and FIG. 18 show that camera flex circuit 49 extends into and is fastened to a cavity in gimbal mount 180. A circuit board rigid portion 196 of camera flex circuit 49 provides support for a gimbal connector 188 shown also in FIG. 18. In one embodiment gimbal connector 188 is a surface mount board-to-board connector, part number DF40C-30DP, manufactured by Hirose Electric, U.S.A., Inc., of Lombard, Ill.

FIG. 16 shows that an image processing rigid-flexible circuit board assembly 44 includes a flexible portion 160 with a rigid circuit board portion 192. Image processing circuit board assembly 44 is located inside fuselage 8, which is illustrated in FIG. 20, and includes the video encoding processor 152 and an SDRAM integrated circuit 156. Other electrical components required for the function of image processing assembly 44 are not shown as they would be well known to one skilled in the art of image processing electronics design.

Rigid circuit board 192 supports a soldered surface mount connector 184 that electrically and mechanically mates with gimbal connector 188 when gimbal 24 is installed in fuselage 8. In one embodiment connector 184 is a surface mount board-to-board connector, part number DF40C(2.0)-30DS-0.4V, also manufactured by Hirose Electric, U.S.A., Inc., of Lombard, Ill.

Figure 19:
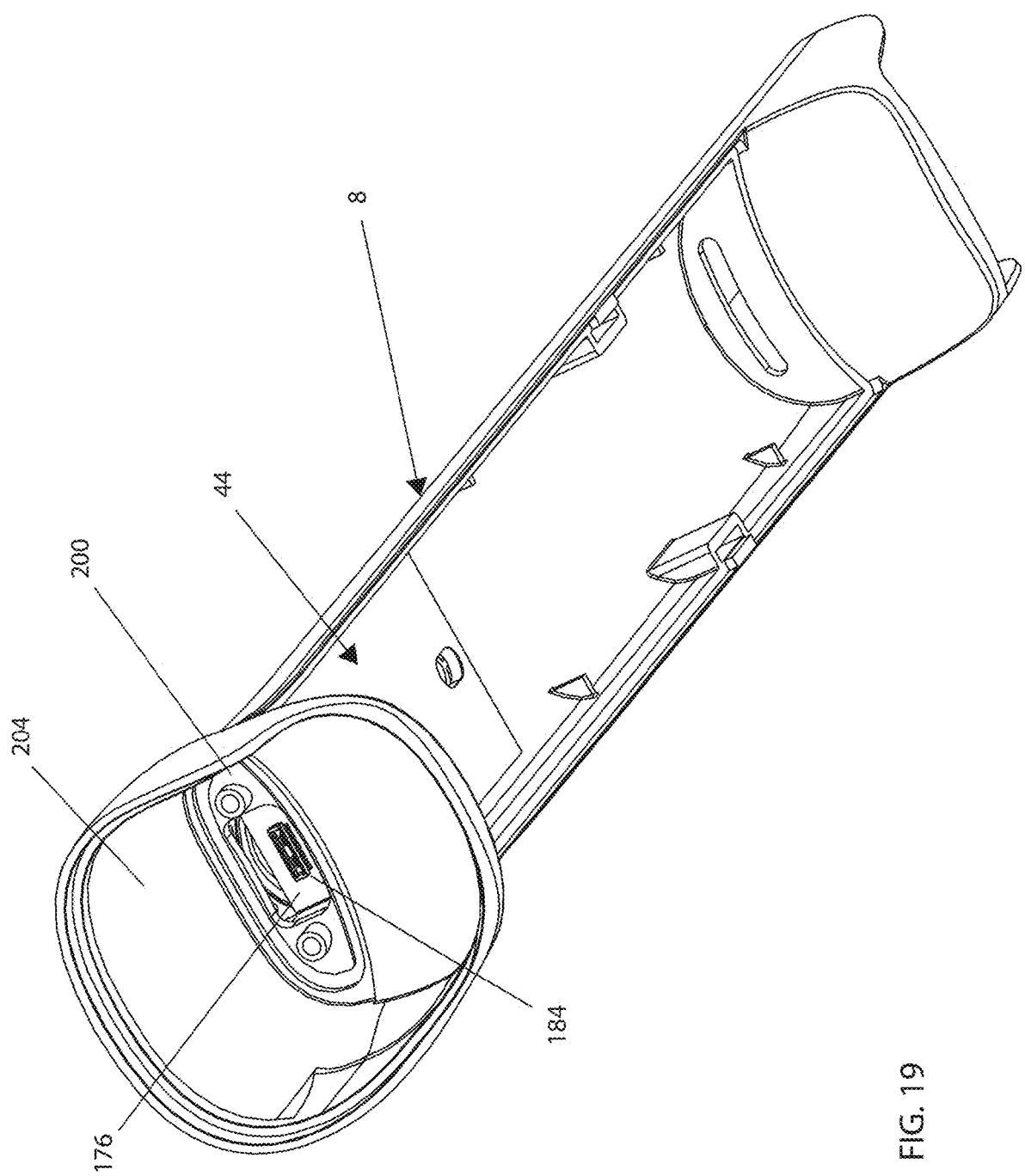
FIG. 19 is an angled view of the gimbal attachment location on the fuselage.

Rigid circuit board portion 192 is fixedly attached to a gimbal screw plate 176. FIG. 19 is a front angled view of fuselage 8 with several parts removed. Gimbal screw plate 176 is fastened to the inside surface of a vertical gimbal attach wall 200 such that the two screw boss portions of gimbal screw plate 176 extend through two holes in gimbal attach wall 200. In one embodiment gimbal screw plate is manufactured out of stainless steel and the screw boss portions are threaded for M2 screws.

Figure 17:
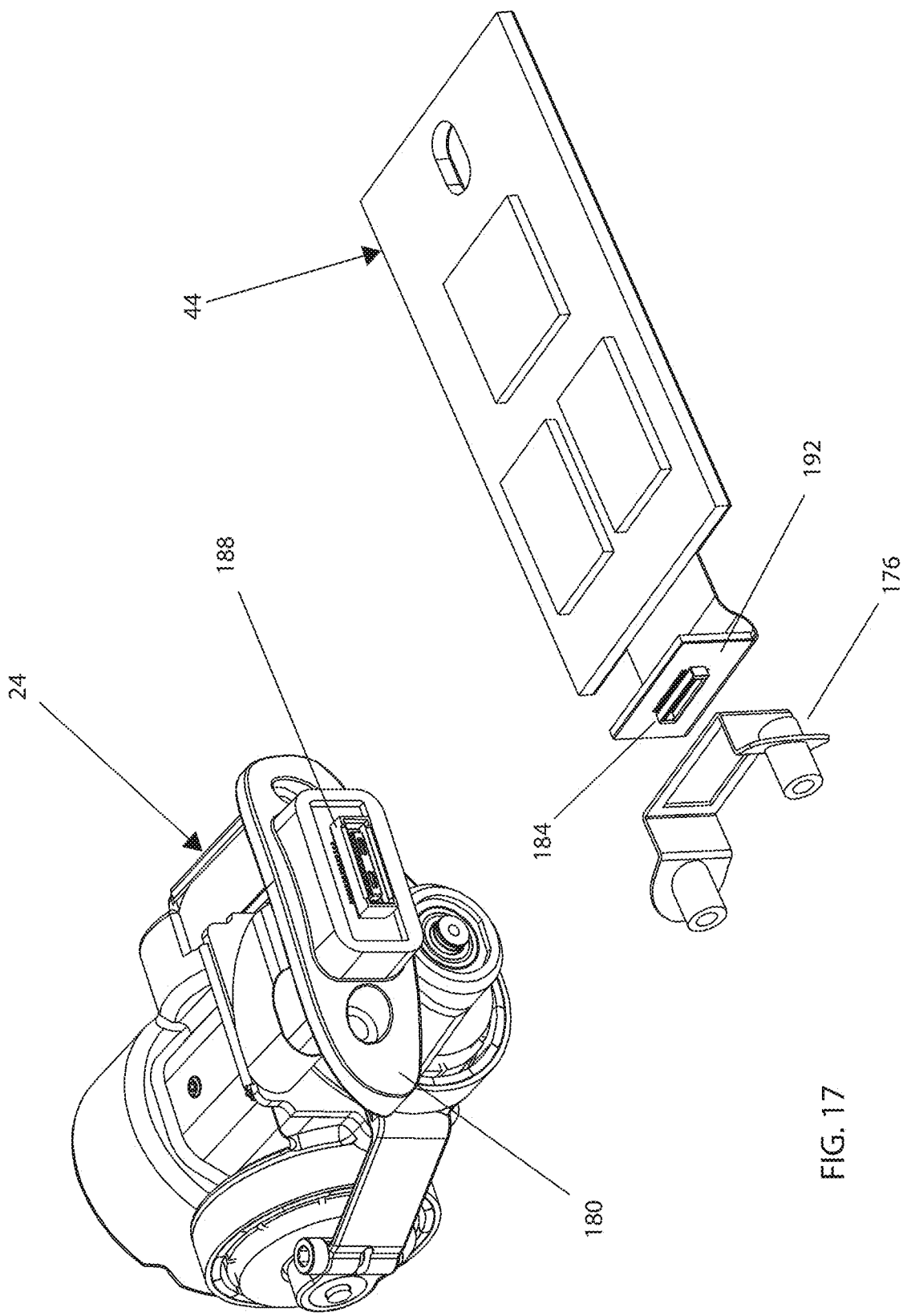
FIG. 17 is an exploded view of the video processing circuit sub-system and a rear view of the gimbal mechanical and electrical connection components.

Gimbal 24 mechanically attaches to fuselage 8 with the screws 172A and B as shown in FIG. 16 and FIG. 17. FIG. 18 shows in a rear view of gimbal 24 that gimbal mount 180 includes two concave bosses that fit closely over gimbal screw plate 176 protruding screw bosses. When screws 172A and B are tightened in gimbal screw plate 176, gimbal 24 is pulled tight against gimbal attach wall 200.

FIG. 18, an exploded view of gimbal 24, shows that camera flex circuit 49 includes an image sensor 164 that is functionally electrically connected to image processing circuit assembly 44 when gimbal 24 is attached to fuselage 8. In one embodiment image sensor 164 is part number IMX377, manufactured by Sony Corporation of Tokyo, Japan. The IMX377 image sensor is capable of capturing 4K (4000×3000 pixels).

Connector 184 is held rigidly to gimbal screw plate 176, which is in turn rigidly attached to gimbal attach wall 200. Connector 188 in gimbal 24 is soldered to rigid circuit board 196 which is compliantly constrained against the rear walls of gimbal mount 180 by a gimbal rubber 168 part. In one embodiment gimbal rubber 168 is comprised of a thermoplastic elastomer with a durometer of SHORE A 60. This provides a compliant fit between connector 184 and connector 188 when gimbal 24 is screwed tightly to fuselage 8.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A motor hub assembly, comprising:
a motor supported by a motor mount;
an outer protective structure circumscribing and spaced apart from the motor mount;
a plurality of spokes extending radially outward from the mount and extending at least between the mount and the protective structure, the plurality of spokes having a cross-sectional shape which is greater in a dimension parallel to a rotational axis of the motor than in a dimension perpendicular to the rotational axis of the motor such that the plurality of spokes are substantially more resistant to flexure out of a plane normal to the rotational axis of the motor than to flexure parallel to the plane normal to the rotational axis of the motor.

2. The motor hub of claim 1, wherein the plurality of spokes have a rectangular cross-section within a plane normal to a line between the motor mount and the protective structure along which the spokes extend.

3. The motor hub of claim 1, wherein the assembly includes at least one propeller blade coupled to the motor, and configured to rotate within a plane normal to the rotational axis of the motor.

4. The motor hub of claim 3, wherein each of the plurality of spokes has a cross-sectional shape which tapers to a narrower width on the side of the spokes proximate the at least one propeller blade.

5. The motor hub of claim 1, wherein the motor mount comprises a rubber material.

6. The motor hub of claim 1, wherein the plurality of spokes extend along lines which do not intersect the rotational axis of the motor.

7. The motor hub of claim 1, wherein the motor mount comprises:
a hub, the hub configured to receive radially inward ends of the plurality of spokes;
an upper plate overlying at least a portion of the radially inward ends of the plurality of spokes received within the plurality of inwardly extending slots; and
a lower plate underlying at least a portion of the radially inward ends of the plurality of spokes received within the plurality of inwardly extending slots.

8. The motor hub of claim 7, wherein the central hub comprises a deformable material and is compressed between the upper plate and the lower plate to frictionally retain the radially inward ends of the plurality of spokes.

9. The motor hub of claim 8, wherein the upper plate comprises a circuit board configured to carry power to the motor.

10. The motor hub of claim 1, wherein the protective structure is concentric with the motor mount.

11. The motor hub of claim 1, wherein the protective structure is concentric with an axis of rotation of the motor.

12. The motor hub of claim 1, wherein the plurality of spokes comprise a carbon fiber material.

13. The motor hub of claim 1, wherein the plurality of spokes comprise a pultruded carbon fiber material.

14. The motor hub of claim 1, wherein the plurality of spokes inhibit displacement of the motor along an axis of rotation of the motor to a greater degree than displacement of the motor within a plane normal to the axis of rotation of the motor.

15. The motor hub of claim 14, wherein the plurality of spokes further inhibit rotation of the motor mount out of the plane normal to the axis of rotation of the motor.

16. A thrust pod assembly comprising:
a protective structure, the protective structure comprising:
a pod top comprising:
an inner hoop;
an outer hoop; and
a plurality of protective ribs connecting the inner hoop to the outer hoop;
a pod bottom comprising an outer hoop; and
a rim fastened to the outer hoop of the pod top and the outer hoop of the pod bottom;
a motor mount; and a plurality of carbon fiber spokes, each spoke fastened at one end to the outer hoop of the pod bottom of the protective structure, the plurality of spokes constrained compressively substantially in plane by a top rigid hub plate and a bottom rigid hub plate.

\* \* \* \* \*